United States Patent
Dinan

(10) Patent No.: US 11,456,840 B2
(45) Date of Patent: *Sep. 27, 2022

(54) TRANSMITTING AND DROPPING SOUNDING REFERENCE SIGNALS BY A WIRELESS DEVICE

(71) Applicant: Ofinno, LLC, Reston, VA (US)

(72) Inventor: Esmael Dinan, Herndon, VA (US)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 114 days.

This patent is subject to a terminal disclaimer.

(21) Appl. No.: 17/001,495

(22) Filed: Aug. 24, 2020

(65) Prior Publication Data
US 2020/0389281 A1    Dec. 10, 2020

Related U.S. Application Data

(63) Continuation of application No. 16/158,911, filed on Oct. 12, 2018, now Pat. No. 10,756,877, which is a
(Continued)

(51) Int. Cl.
*H04L 5/00*    (2006.01)
*H04L 1/18*    (2006.01)
(Continued)

(52) U.S. Cl.
CPC .......... *H04L 5/0091* (2013.01); *H04L 1/1812* (2013.01); *H04L 5/001* (2013.01);
(Continued)

(58) Field of Classification Search
CPC ..... H04L 5/0091; H04L 1/1812; H04L 5/001; H04L 5/0057; H04L 27/2613; H04L 5/0007; H04L 5/0048; H04W 52/146
See application file for complete search history.

(56) References Cited

U.S. PATENT DOCUMENTS

| | | | |
|---|---|---|---|
| 10,110,362 B2 | 10/2018 | Dinan | |
| 2013/0242911 A1 | 9/2013 | Heo et al. | |

(Continued)

FOREIGN PATENT DOCUMENTS

| | | |
|---|---|---|
| CN | 103109489 A | 5/2013 |
| JP | 2014525711 A | 9/2014 |

(Continued)

OTHER PUBLICATIONS

InterDigital Communications. "SRS power allocation and handling in dual connectivity", 3GPP TSG-RAN WG1#79 R1-145206 (R1-145045) San Francisco, USA, Nov. 17-21, 2014.
(Continued)

*Primary Examiner* — John D Blanton
(74) *Attorney, Agent, or Firm* — Arch & Lake LLP

(57) ABSTRACT

A wireless device receives configuration parameters of cells grouped into physical uplink control channel (PUCCH) groups. The cells are in the same timing advance group. A first sounding reference signal (SRS) is transmitted via a first cell of a first PUCCH group in parallel with transmission of a first PUCCH via a second cell of a second PUCCH group. In response to a second PUCCH being transmitted via the first cell in parallel with a configured transmission of a second SRS, the configured transmission of the second SRS via the first cell is dropped.

20 Claims, 20 Drawing Sheets

Related U.S. Application Data continuation of application No. 15/672,887, filed on Aug. 9, 2017, now Pat. No. 10,110,362, which is a continuation of application No. PCT/US2016/025870, filed on Apr. 4, 2016.

(60) Provisional application No. 62/143,181, filed on Apr. 5, 2015.

(51) Int. Cl.
*H04L 27/26* (2006.01)
*H04W 52/14* (2009.01)
*H04W 28/18* (2009.01)
*H04W 72/00* (2009.01)
*H04W 56/00* (2009.01)

(52) U.S. Cl.
CPC ........ *H04L 5/0057* (2013.01); *H04L 27/2613* (2013.01); *H04W 52/146* (2013.01); *H04L 5/0007* (2013.01); *H04L 5/0048* (2013.01); *H04L 5/0053* (2013.01); *H04L 5/0055* (2013.01); *H04L 5/0098* (2013.01); *H04W 28/18* (2013.01); *H04W 56/0005* (2013.01); *H04W 72/00* (2013.01)

(56) References Cited

U.S. PATENT DOCUMENTS

| | | | |
|---|---|---|---|
| 2013/0272233 A1 | 10/2013 | Dinan | |
| 2016/0044617 A1 | 2/2016 | Vajapeyam et al. | |
| 2016/0095069 A1* | 3/2016 | Noh | H04W 52/34 455/452.1 |
| 2016/0255621 A1* | 9/2016 | Wu | H04L 5/0048 370/329 |
| 2017/0187416 A1 | 6/2017 | Kim et al. | |
| 2017/0347270 A1 | 11/2017 | Iouchi et al. | |

FOREIGN PATENT DOCUMENTS

| | | |
|---|---|---|
| KR | 20120135526 A | 12/2012 |
| KR | 20140125819 A | 10/2014 |
| WO | 2013112952 | 8/2013 |

OTHER PUBLICATIONS

First Office Action of the Chinese application No. 201680019160.8, dated Sep. 29, 2018.
Written Opinion of the International Search Authority in the international application No. PCT/US2016/025870, dated Jun. 13, 2016.
European Search Report in the European application No. 17183265.2, dated Sep. 13, 2017.
Notice of Allowance of the Korean application No. 10-2017-7027764, dated Dec. 20, 2017.
Nokia Corporation. "Running 36.300 CR to capture agreements on carrier aggregation enhancements", 3GPP TSG-RAN WG2 Meeting #89 R2-150728, Athens, Greece, Feb. 9-13, 2015.
First Office Action of the Japanese application No. 2017-546854, dated Mar. 27, 2018.
Notice of Allowance of the Japanese application No. 2017-546854, dated Oct. 19, 2018.
First Office Action of the U.S. Appl. No. 15/089,851, dated Oct. 17, 2017.
Final Office Action of the U.S. Appl. No. 15/089,851, dated Jun. 21, 2018.
First Office Action of the U.S. Appl. No. 15/672,877, dated Dec. 15, 2017.
First Office Action of the U.S. Appl. No. 16/158,911, dated Nov. 8, 2019.
3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG1 #68, Feb. 6-10, 2012, Dresden, Germany, R1-120539, Agenda item: 7.2.3, Source: Qualcomm Incorporated, Title: SRS operation in multiple TA offset CA.
3GPP TSG RAN WG1 #80 R1-150468, Feb. 9-Feb. 13, 2015, Athens, Greece, Agenda item: 7.2.2.1, Source: Qualcomm Incorporated, Title: PUCCH on SCell.
3GPP TSG RAN WG1 #80 R1-150823, Athens, Greece, Feb. 9-13, 2015, Title: WF on PUCCH on SCell for CA, Source: NTT DOCOMO, NEC, Sharp, Softbank Mobile,Intel, Ericsson, KDDI.
3GPP TSG RAN WG1 Meeting #80 R1-150101, Athens, Greece, Feb. 9-13, 2015, Source: CATT, Title: PUCCH on SCell for Rel-13 CA.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.
3GPP TSG RAN WG1 Meeting #80 R1-150210, Athens, Greece, Feb. 9-13, 2015, Agenda Item: 7.2.2.2.3, Source: LG Electronics, Title: UL control signaling for supporting CA of up to 32 carriers.
3GPP TSG RAN WG1 Meeting #80 R1-150489, Athens, Greece, Nov. 17-21, 2014, Source: ITL Inc., Title: Uplink control signaling enhancements for b5C CA.
3GPP TSG RAN WGI Meeting #70bis RI-124550, San Diego, USA, S-II Oct. 2012, Agenda item: 7.2.4, Source: HTC, Title: Parallel transmissions of SRS+SRS in different TAGs.
3GPP TSG-RAN WG1 #80 R1-150085, Athens, Greece, Feb. 9-13, 2015, Source: Intel Corporation, Title: Support of PUCCH on Scell for CA.
3GPP TSG-RAN WG1 Meeting #80 R1-150494, Athens, Greece, Feb. 9-13, 2015, Agenda item: 7.2.2.2.1, Source: Nokia Corporation, Nokia Networks, Title: On Necessary Carrier Aggregation Enhancements Beyond 5 Carriers.
3GPP TSG-RAN WG2 Meeting #89, Athens, Greece, Feb. 9-13, 2015, R2-150372, Agenda Item: 7.2, Source: Huawei, HiSilicon, Title: Introduce PUCCH on SCell for CA beyond 5 carriers.
International Search Report dated Jun. 13, 2016, in PCT/US2016/025870.
Notice of Allowance of the Korean application No. 10-2018-7003367, dated Nov. 25, 2021, (3 pages).

* cited by examiner

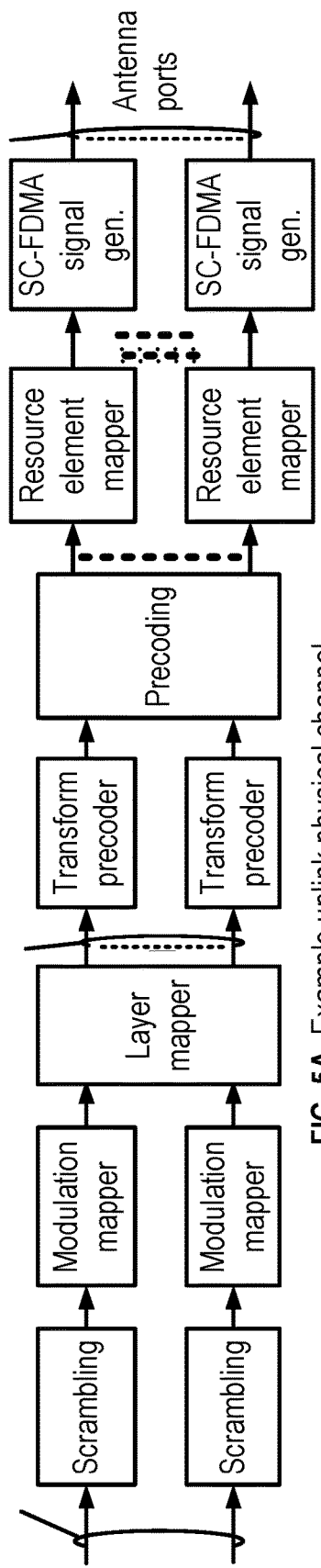
FIG. 5A Example uplink physical channel
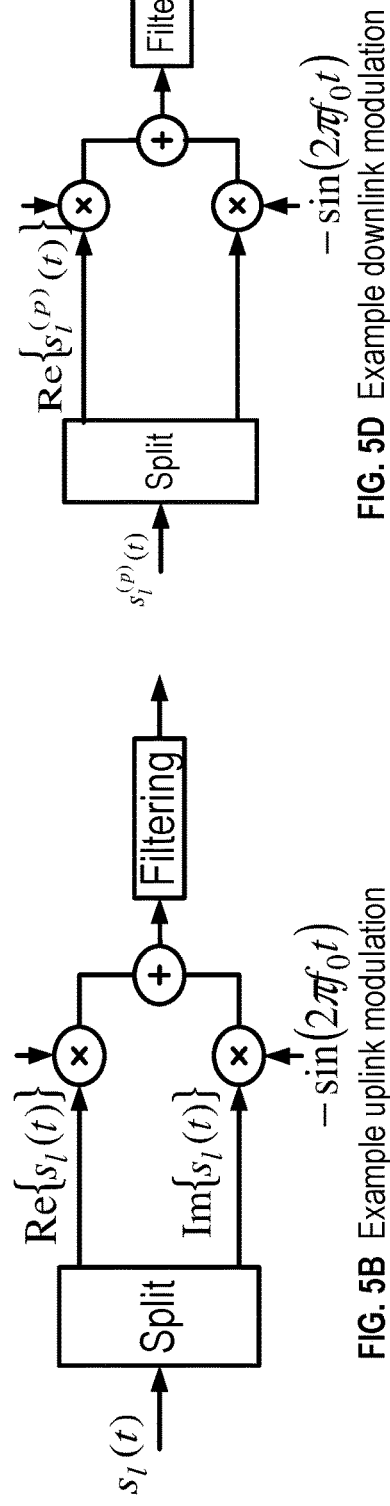
FIG. 5B Example uplink modulation
FIG. 5D Example downlink modulation
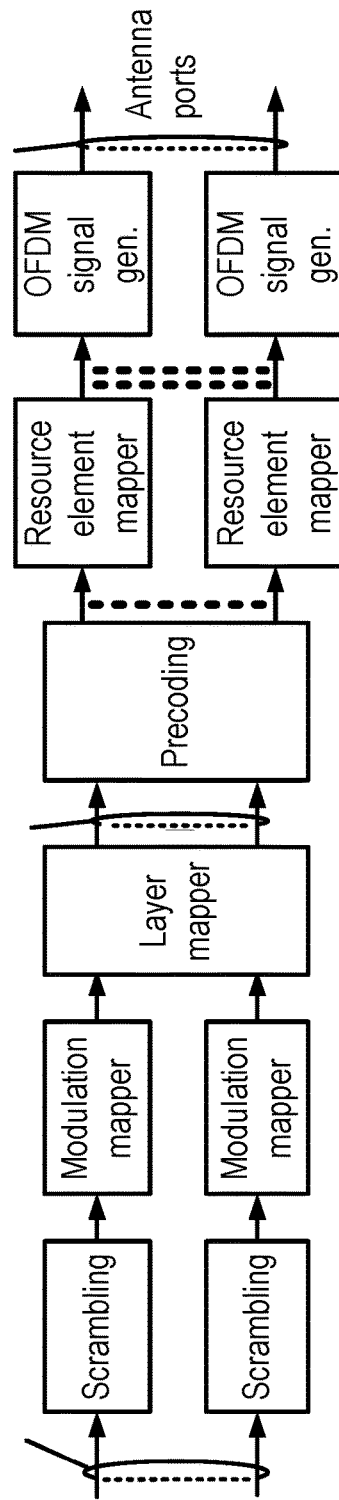
FIG. 5C Example downlink physical channel FIG. 7 Dual-Connectivity- two MAC entities at UE side Example 1: 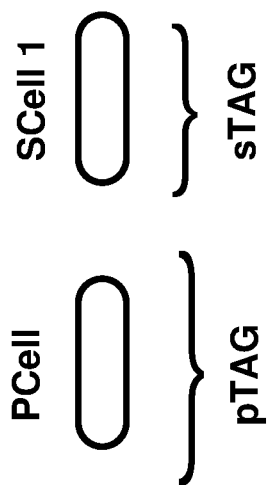
Example 2: 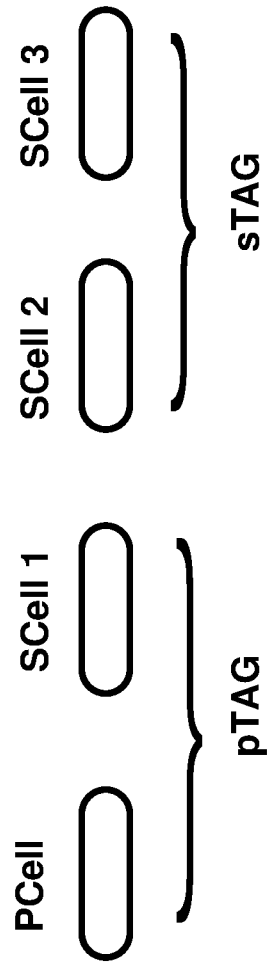
Example 3: 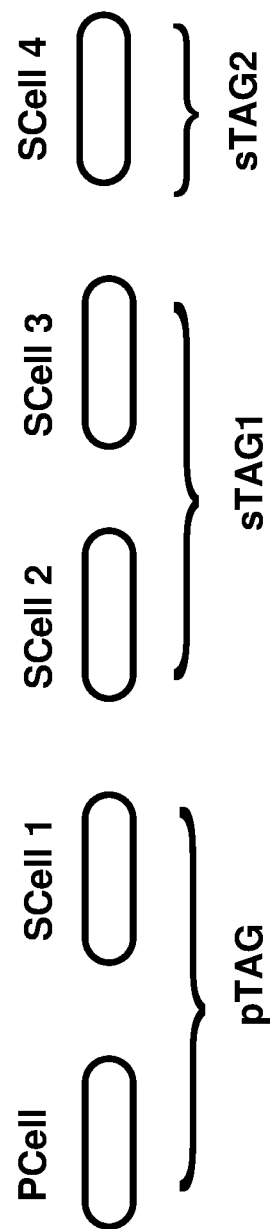
FIG. 8

| Example Trans. Rule | Condition in the same PUCCH group |
|---|---|
| May not Transmit SRS | whenever SRS snd PUSCH transmissions happen to overlap in the same symbol |
| May not Transmit type 0 SRS | whenever type 0 triggered SRS and PUCCH format 2/2a/2b transmissions happen to coincide in the same subframe |
| May not Transmit type 1 SRS | whenever type 1 triggered SRS and PUCCH format 2/2a/2b or format 2 with HERQ-ACK transmissions happen to coincide in the same subframe |
| May not Transmit PUCCH format 2 w/o HARQ-ACK | whenever type 1 triggered SRS and PUCCH format 2 without HARQ-ACK transmissions happen to coincide in the same subframe |
| May not transmit SRS | whenever SRS transmission and PUCCH transmission carrying HARQ-ACK and/or positive SR happen to coincide in the same subframe if the parameter *achNackSRS-SimultaneousTransmission* is *FALSE* |
| May not transmit SRS | For FDD-TDD and frame structure 1 on the corresponding cell with PUCCH resource (primary-cell or PUCCH-secondary-cell), whenever SRS transmission and PUCCH transmission carrying HARQ-ACK and/or positive SR using shortened format happen to overlap inthe same symbol (as SRS) if the parameter *achNackSRS-SimultaneousTransmission* is *TRUE*. |
| May transmit SRS | whenever SRS transmission and PUCCH transmission carrying HARQ-ACK and/or positive SR using shortened format happen to coincide in the same subframe if the parameter *achNackSRS-SimultaneousTransmission* is *TRUE*. |
| May not transmit SRS | whenever SRS transmission on any serving cells and PUCCH transmission carrying HARQ-ACK and/or positive SR using normal PUCCH format happen to coincide in the same subframe. |
| UE may not transmit SRS | In UpPTS, whenever SRS transmission instance overlaps with the PRACH region for preamble format 4 or exceeds the range of uplink system bandwidth configured in the serving cell |
| UE may not transmit SRS | whenever SRS and a PUSCH transmission corresponding to a Random Access Response Grant or a retransmission of the same transport block as part of the contention based random access procedure coincide in the same |

FIG. 15

Table A

| SRS Configuration Index $I_{SRS}$ | SRS Periodicity $T_{SRS}$ (ms) | SRS Subframe Offset $T_{offset}$ |
|---|---|---|
| 0 - 1 | 2 | $I_{SRS}$ |
| 2 - 6 | 5 | $I_{SRS}$ - 2 |
| 7 - 16 | 10 | $I_{SRS}$ - 7 |
| 17 - 36 | 20 | $I_{SRS}$ - 17 |
| 37 - 76 | 40 | $I_{SRS}$ - 37 |
| 77 - 156 | 80 | $I_{SRS}$ - 77 |
| 157 - 316 | 160 | $I_{SRS}$ - 157 |
| 317 - 636 | 320 | $I_{SRS}$ - 317 |
| 637 - 1023 | reserved | reserved |

FIG. 16A

Table B

| Subframe index $n$ | 0 | | 1 | | 2 | 3 | 4 | 5 | 6 | | 7 | | 8 | 9 |
|---|---|---|---|---|---|---|---|---|---|---|---|---|---|---|
| | 1st symbol of $U_p$PTS | 2nd symbol of $U_p$PTS | 1st symbol of $U_p$PTS | 2nd symbol of $U_p$PTS | | | | | 1st symbol of $U_p$PTS | 2nd symbol of $U_p$PTS | | | | |
| $k_{SRS}$ in case $U_p$PTS length of 2 symbols | 0 | 1 | | | 2 | 3 | 4 | | 5 | 6 | | | 7 | 8 | 9 |
| $k_{SRS}$ in case $U_p$PTS length of 1 symbol | | 1 | | | 2 | 3 | 4 | | | 6 | | 7 | 8 | 9 |

FIG. 16B

Table C

| Subframe index $n$ | | | | | | | | | | |
|---|---|---|---|---|---|---|---|---|---|---|
| 0 | 1 | 2 | 3 | 4 | 5 | 6 | 7 | 8 | 9 | |
| | 1st symbol of $U_pPTS$ | 2nd symbol of $U_pPTS$ | 3rd symbol of $U_pPTS$ | 4th symbol of $U_pPTS$ | | | 1st symbol of $U_pPTS$ | 2nd symbol of $U_pPTS$ | 3rd symbol of $U_pPTS$ | 4th symbol of $U_pPTS$ |
| $k_{SRS}$ in case $U_pPTS$ length of 4 symbols | 0 | 1 | 2 | 3 | | | 5 | 6 | 7 | 8 |
| $k_{SRS}$ in case $U_pPTS$ length of 1 symbol | 2 | 3 | | | | | 7 | 8 | | |

FIG. 16C

TRANSMITTING AND DROPPING SOUNDING REFERENCE SIGNALS BY A WIRELESS DEVICE

CROSS-REFERENCE TO RELATED APPLICATIONS

This application is a continuation of Ser. No. 16/158,911, filed Oct. 12, 2018, which is a continuation of U.S. patent application Ser. No. 15/672,877, filed Aug. 9, 2017, (now U.S. Pat. No. 10,110,362, issued Oct. 23, 2018), which is a continuation of International Application No. PCT/US2016/25870, filed Apr. 4, 2016, which claims the benefit of U.S. Provisional Application No. 62/143,181, filed Apr. 5, 2015, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 15 presents tables providing some example signal transmission scenarios as per an aspect of a disclosed embodiment.

FIG. 16A, FIG. 16B and FIG. 16C present tables providing some example configuration parameters as per an aspect of a disclosed embodiment.

DETAILED DESCRIPTION OF EMBODIMENTS

Figure 1:
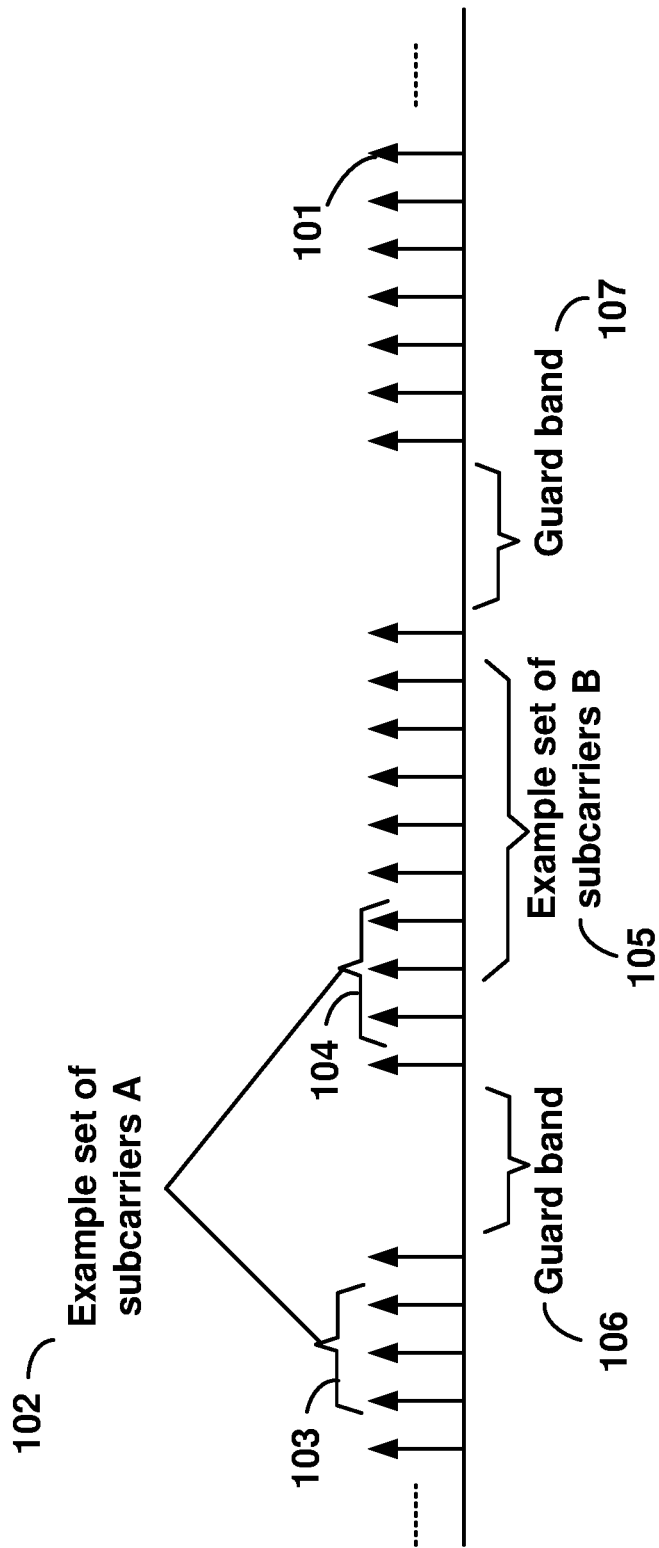
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
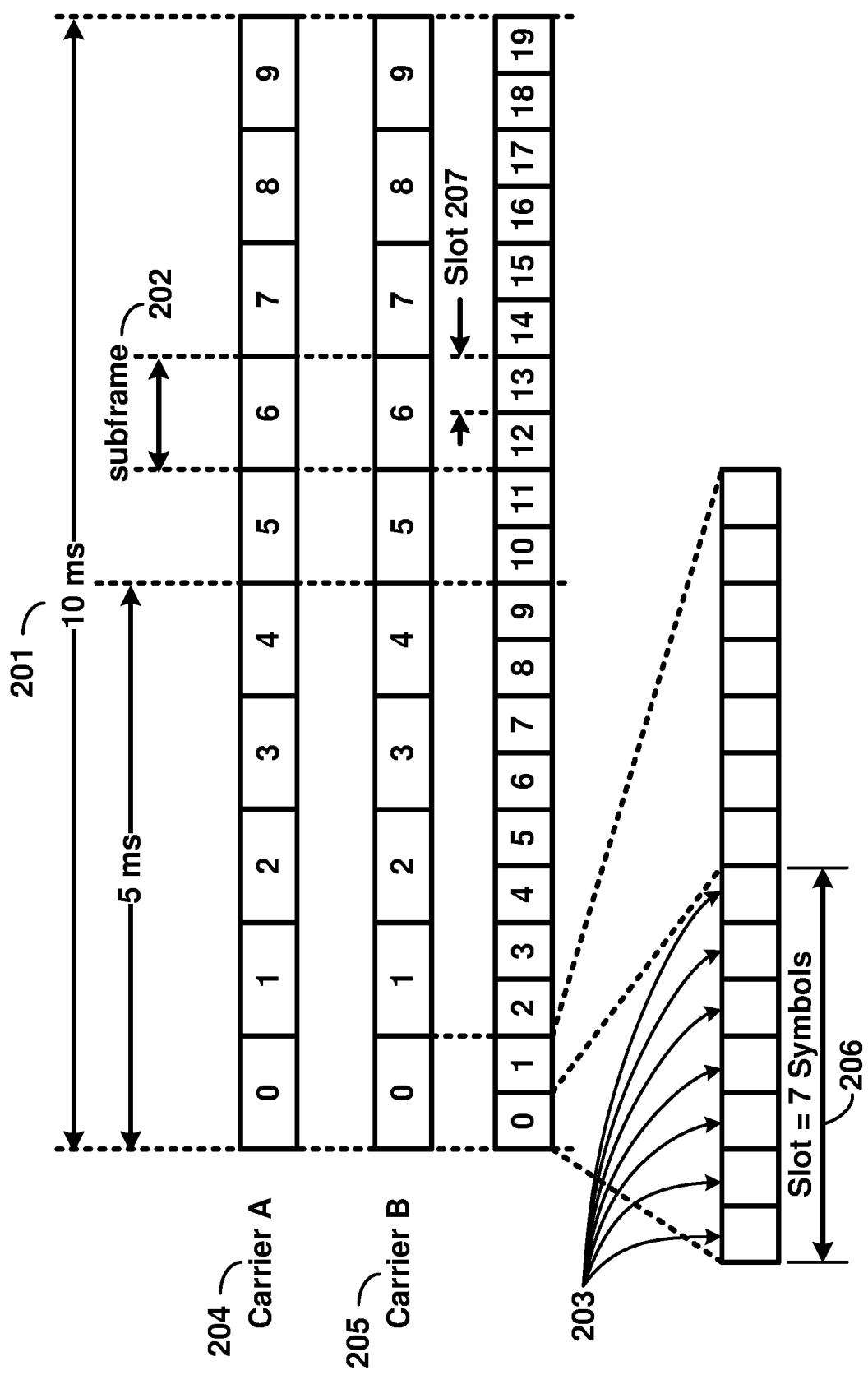
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
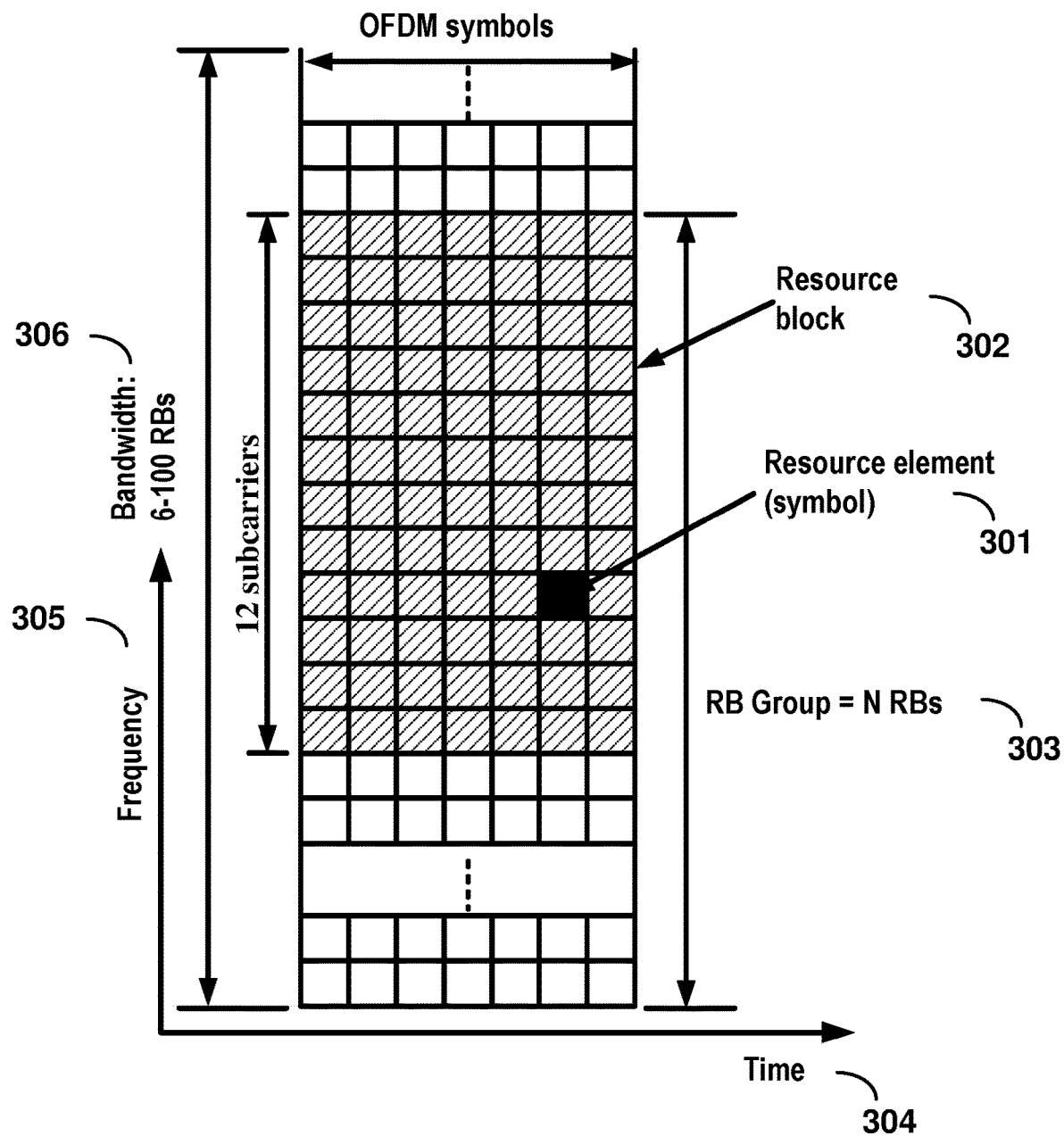
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
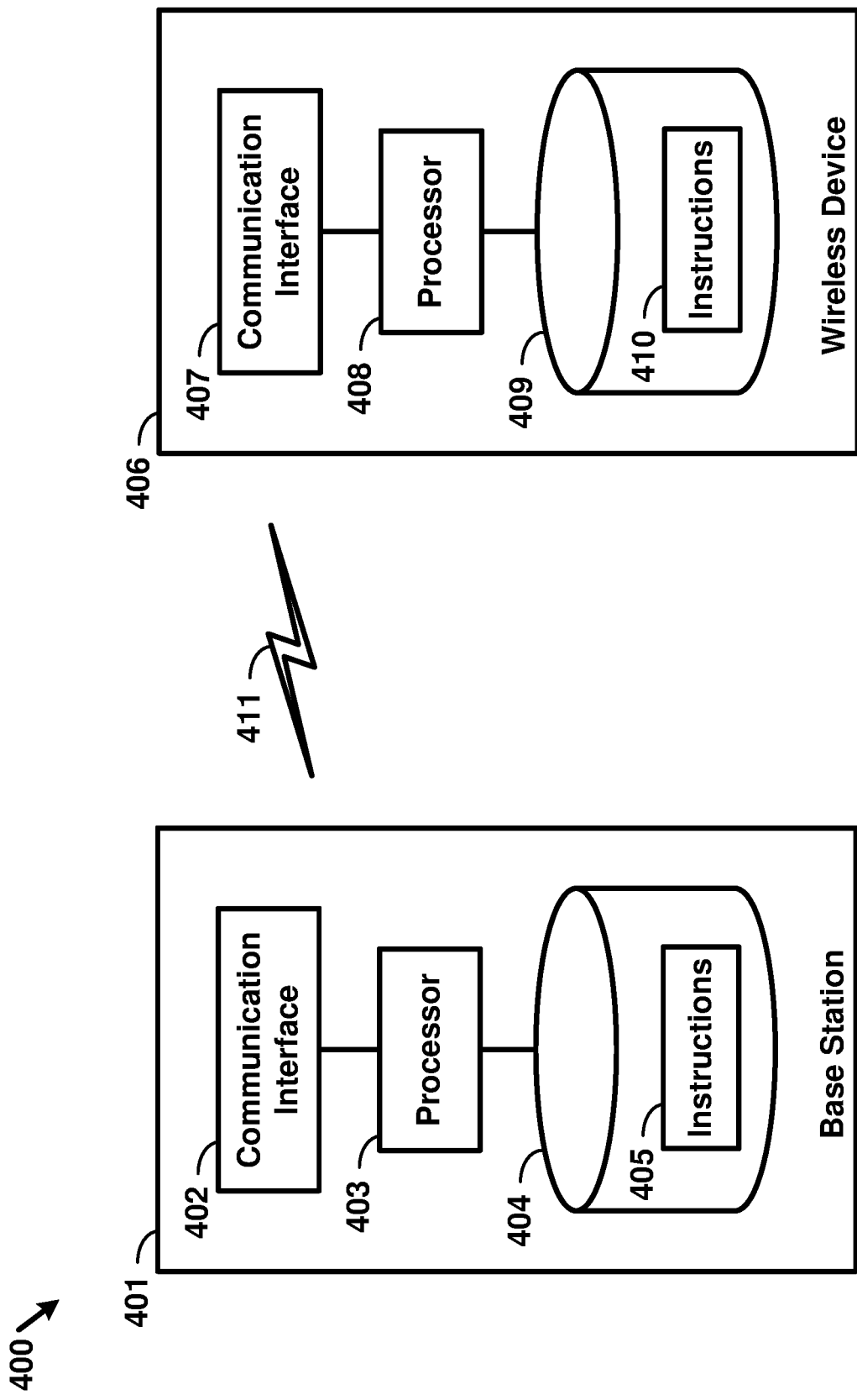
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
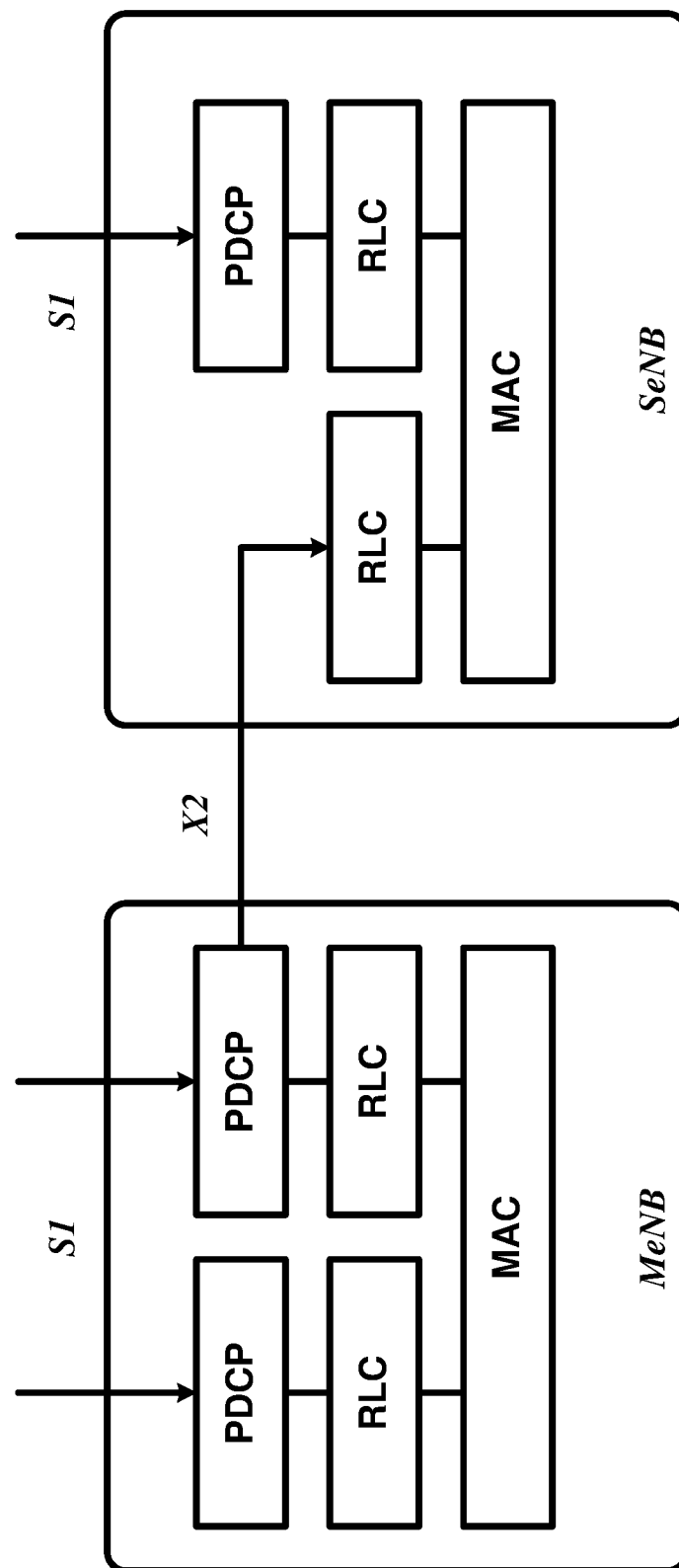
FIG. 6 is an example diagram for a protocol structure with CA and DC as per an aspect of an embodiment of the present invention.
Figure 7:
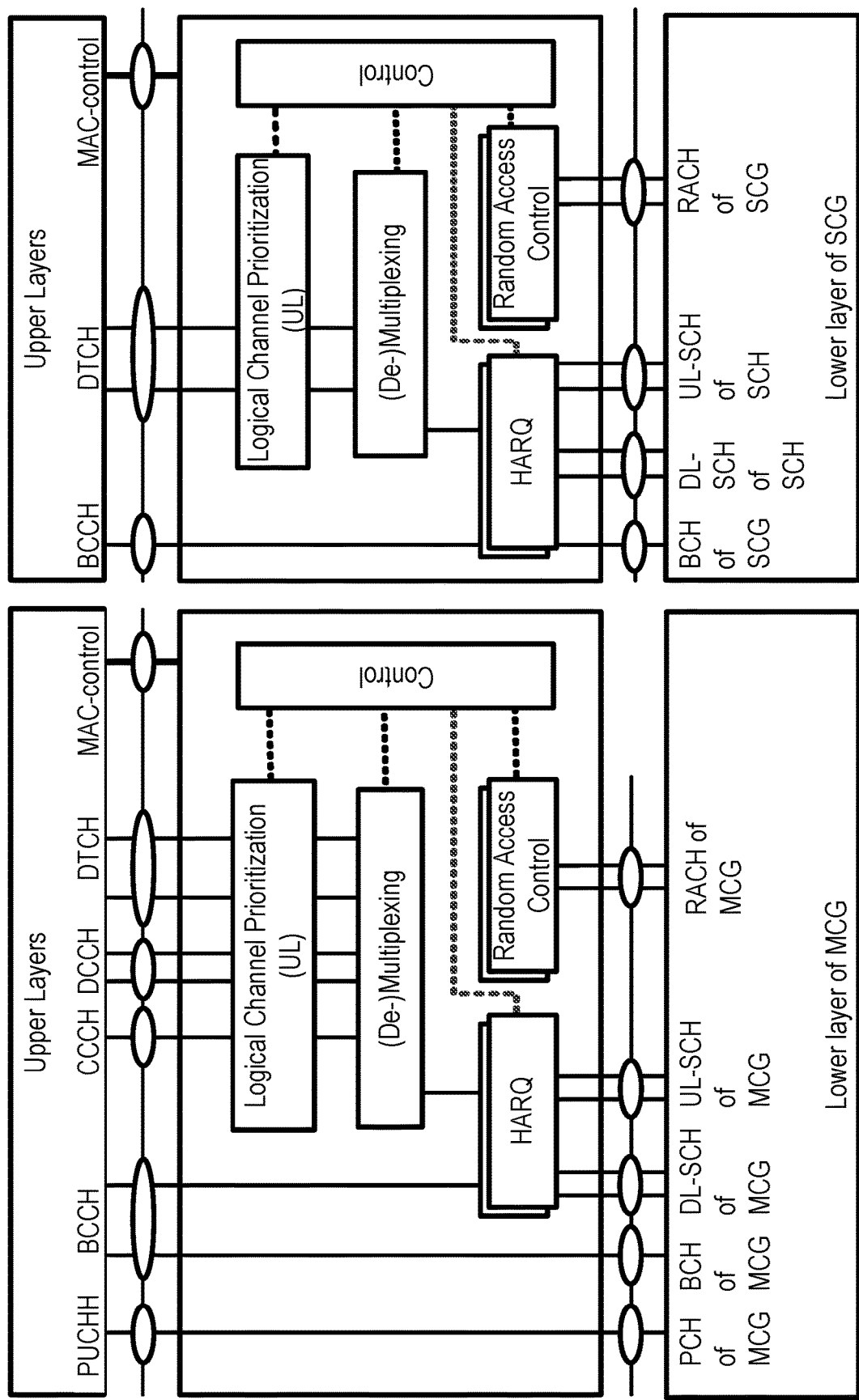
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
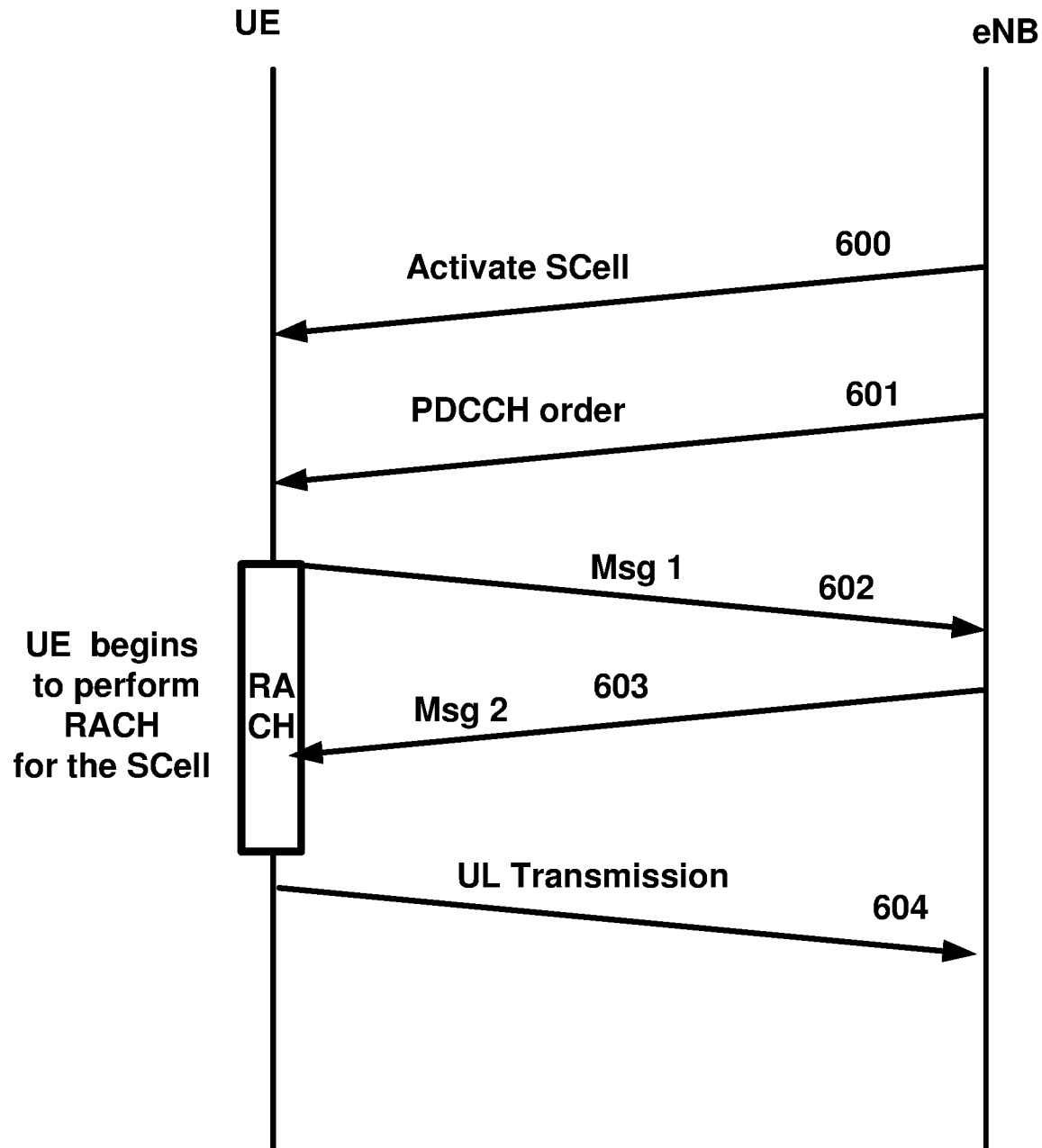
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
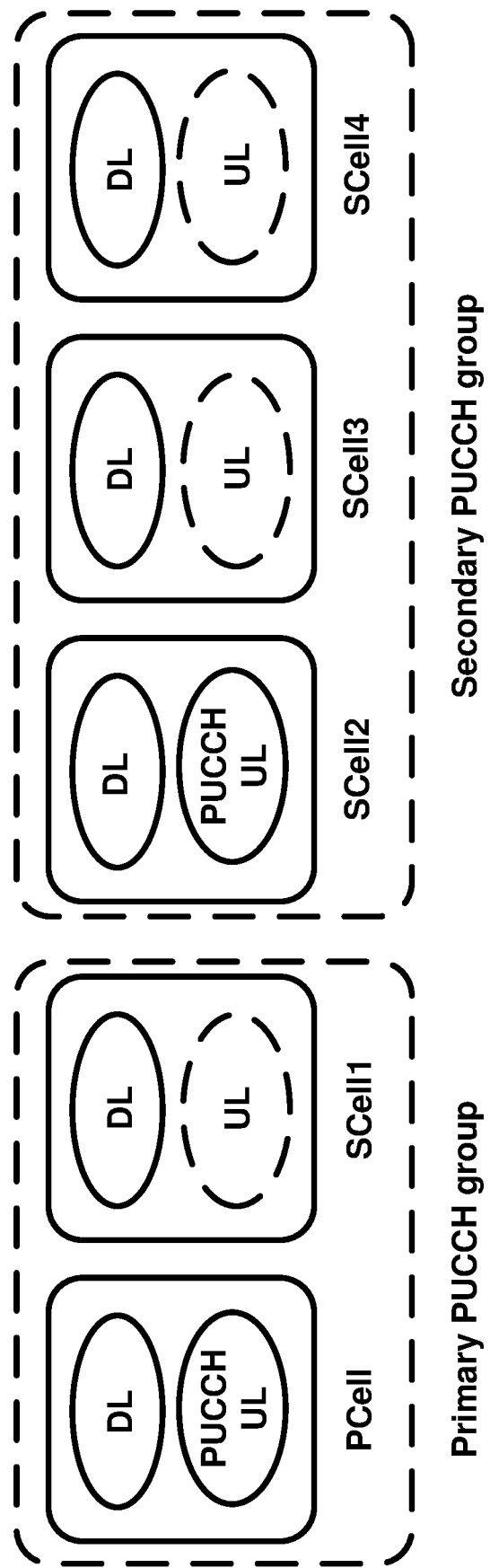
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed(e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
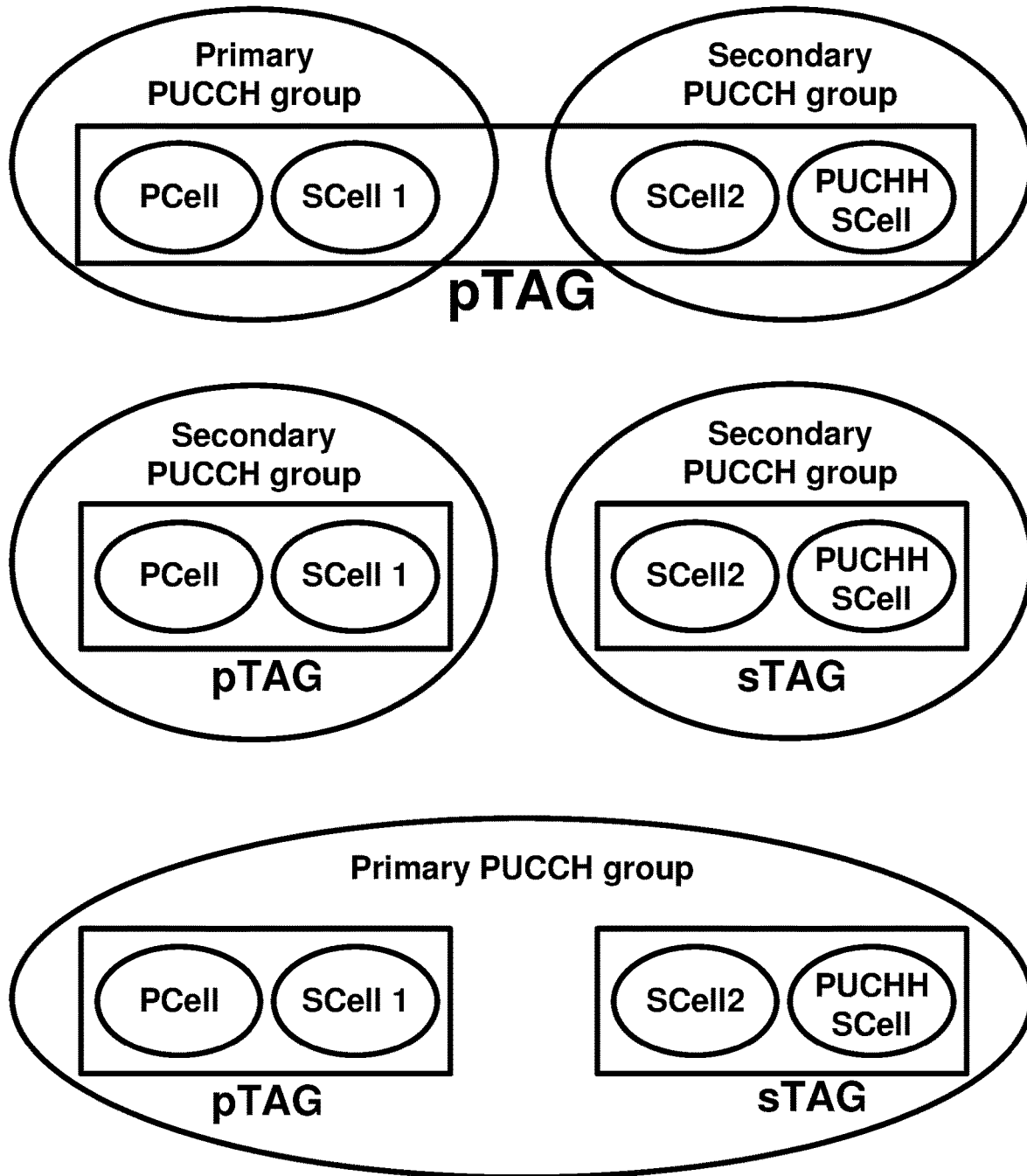
FIG. 11 illustrates example groupings of cells into one or more PUCCH groups and one or more TAGs as per an aspect of an embodiment of the present invention.
Figure 12:
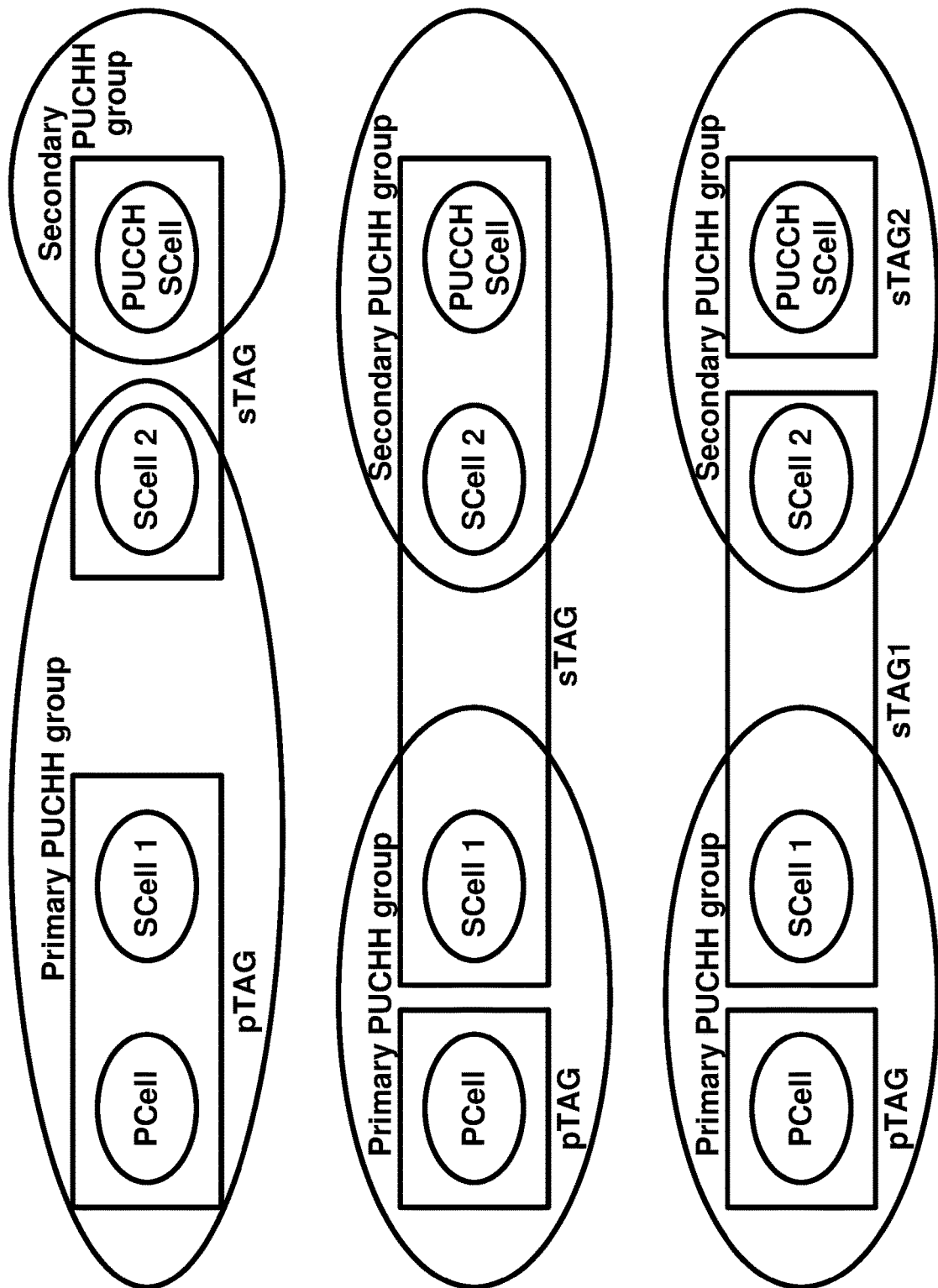
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
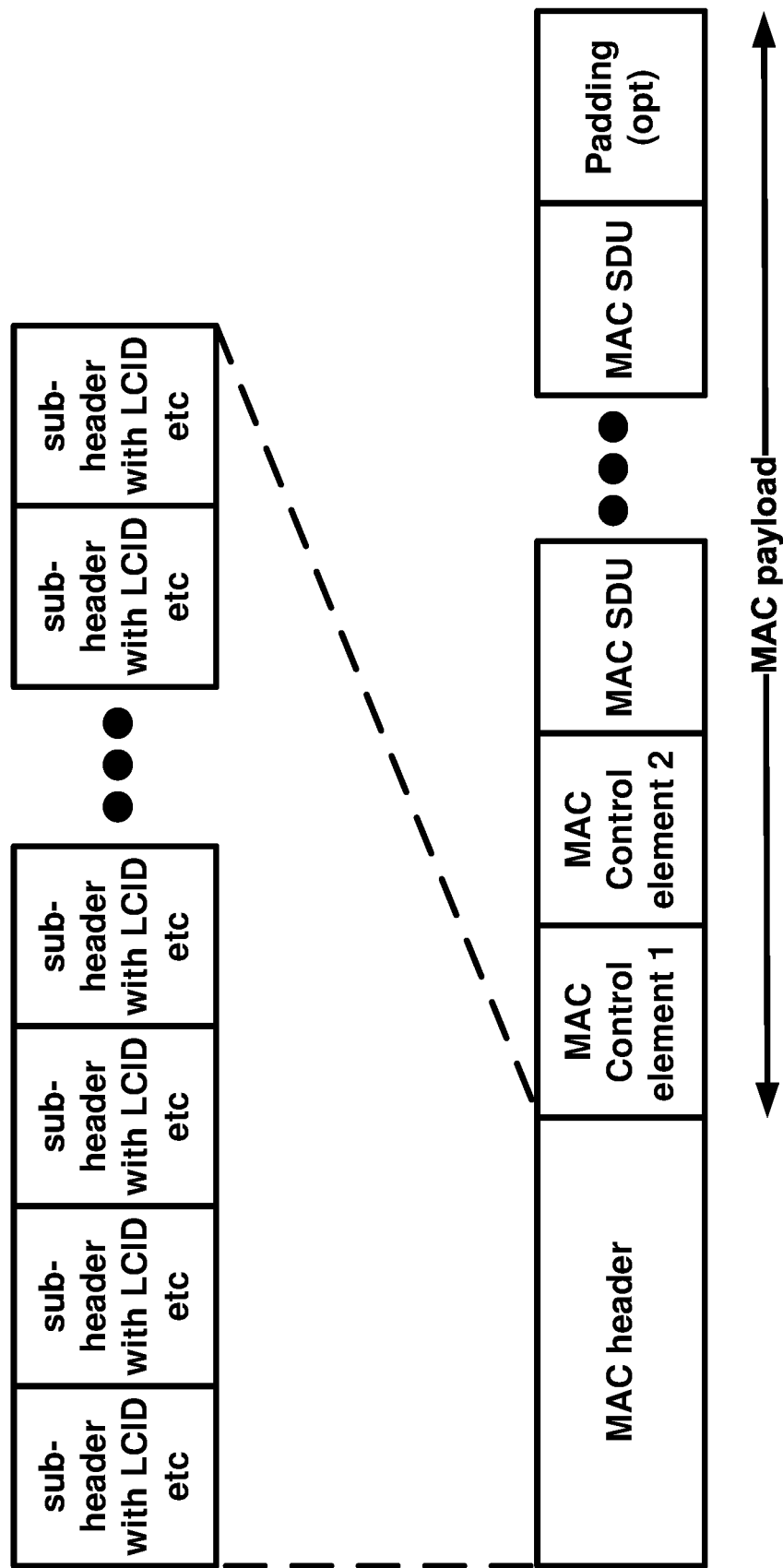
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCCH}$), nRB-CQI ($N_{RB}^{(2)}$), nCS-An ($N^{hd}\ cs^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1},n1PUCCH-AN-Rep: INTEGER (0 . . . 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH,\ ANRep}^{(1,\ \tilde{p})}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running. A timer can be started if it is not running or restarted if it is running. For example, a timer may be started or restarted from its initial value.

When DC is configured, the wireless device has a first PHY and MAC entity for managing communications with a Master eNB, and has a second PHY and MAC entity for managing communications with a Secondary eNB. When DC is not configured, a single PHY and MAC entity manages communications with a single eNB on multiple cells. For example, when PUCCH groups are configured, a UE may employ a single PHY/MAC entity for multiple PUCCH cell groups. SRS mechanisms described in example embodiments are applicable to a single PHY and MAC entity.

According to release 12 of the LTE standards, 3GPP TS 36.213, a UE may drop a sounding reference signal (SRS) transmission in many scenarios when an SRS transmission overlaps with the transmission of a PUCCH, a PUSCH, and/or a PRACH. SRS dropping when multiple TAGs in a CG are not configured may be higher since parallel transmission of SRS with PUSCH, PUCCH, PRACH in a CG may not be allowed.

The limitations in Release-12 may cause excessive dropping of SRS signals in the uplink, especially when a large number of carriers are configured and activated, and/or when uplink traffic is high, and/or when more than one PUCCH is configured. For example, when PUCCH groups are configured, PUCCH may be configured on a PCell and one or more SCells for transmission of control information to a given eNB. This may increase the possibility of overlapping PUCCH and SRS transmission that may result in excessive SRS dropping. When a relatively large number of uplink cells are configured, for example when up to 32 cells are configured, and when uplink traffic is high, the possibility of overlapping transmission of SRS and PUSCH transport blocks increases. This may result in excessive SRS dropping.

SRS signals may be transmitted by the UE, and may provide a base station with information about channel conditions. Reducing the dropping possibility of SRS signals in the uplink may enhance a base station's ability to estimate radio channel conditions. In an example scenario, the base station may need to transmit, in parallel, a combination of one or more of the following signals: a PRACH signal, a PUCCH signal, PUSCH signal(s), and SRS signal(s). The implementation of mechanisms employing parallel transmission of SRS and/or PRACH signals with other uplink physical channel signals may enhance network performance. Example embodiment of the invention may be applicable when the UE is not uplink power limited.

In an example embodiment of the invention, when multiple TAGs are configured legacy release-12 embodiments may be implemented considering that two or more cells may include PUCCH resources. The current mechanisms may be implemented considering that there may be more than one cell with PUCCH transmissions. When SRS transmissions collide with a PUCCH of one of the cells, legacy mechanisms may be implemented for that given cell with PUCCH. PUCCH resources of different cells may have different configuration parameters. For example, ackNackSRS-SimultaneousTransmission IE may be configured differently for the primary cell compared with a PUCCH secondary cell. SRS configuration and transmission on a primary cell may not be the same as SRS transmission on a PUCCH secondary cell. Configuration of multiple TAGs may reduce SRS dropping, since it may allow parallel transmission of SRS with PUCCH/PUSCH within a TAG or in different TAGs. It also may allow parallel transmission of SRS with PRACH in different TAGs. Example embodiments of the invention may improve SRS transmission.

In an example embodiment, when PUCCH groups are configured, SRS transmissions may be controlled independently in a given cell group. A PUCCH group may implement SRS transmission within its own PUCCH group considering PUSCH/PUCCH transmissions within that cell group. A UE may transmit its radio resource capabilities to the eNB using an RRC message and indicate that the UE has such capability (e.g. capability of PUCCH configurations on multiple cells). The eNB may transmit one or more RRC messages configuring the cells and SRS signals considering the capabilities of the UE (e.g. the eNB may configure multiple PUCCH groups).

For example, the rules for transmitting and not transmitting (dropping) SRS signals in a given cell may be a function of cells within the associated PUCCH group and may not depend on PUCCH/PUSCH transmissions of another cell group. For example, an SRS in a symbol of an SCell of a primary PUCCH group may be transmitted in parallel with PUSCH transport block transmitted in a cell in a secondary PUCCH group. In another example, SRS in a symbol of an SCell of a PUCCH group may not be transmitted (be dropped) when it is scheduled for parallel transmission with PUSCH transport block transmitted in the same or a different cell in the same PUCCH group. Similar examples may be provided for parallel transmission of PUCCH signals and SRS signals. For example, an SRS in a symbol of an SCell of a primary PUCCH group may be transmitted in parallel with PUCCH transmitted in a cell in a secondary PUCCH group. In another example, SRS in a symbol of an SCell of a PUCCH group may not be transmitted (be dropped) when it is scheduled for parallel transmission with PUCCH (the PUCCH that is transmitted in the last symbol, e.g. the normal format and not the shortened format) transmitted in the same or a different cell in the same PUCCH group. This may not be applicable to some scenarios, for example, when type 1 triggered SRS and PUCCH format 2 without HARQ-ACK transmissions happen to coincide in the same subframe (as described below).

Figure 14:
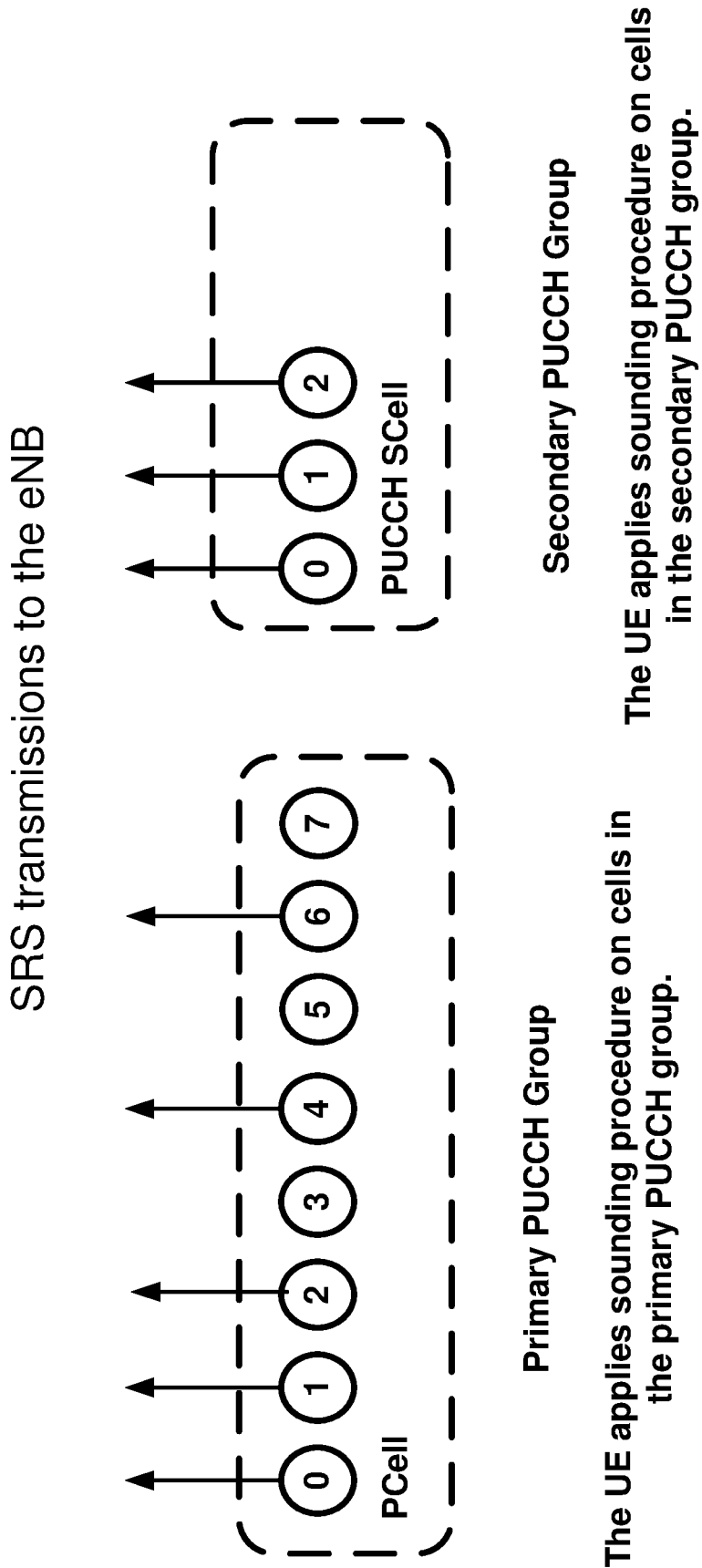
FIG. 14 shows example PUCCH groups and SRS transmissions as per an aspect of a disclosed embodiment.

FIG. 14 shows example PUCCH groups and SRS transmissions as per an aspect of a disclosed embodiment. If the UE is configured with a PUCCH SCell (configured with PUCCH groups), the UE may apply the sounding procedures for both primary PUCCH group and secondary PUCCH group. The UE may apply the sounding procedures for the primary PUCCH group independent of the signals transmitted in the secondary PUCCH group. The UE may apply the sounding procedures for the secondary PUCCH group independent of the signals transmitted in the primary PUCCH group.

The example embodiments of the invention, reduces SRS dropping and enables independent SRS transmission procedure in different PUCCH groups. The example embodiments may apply when a UE is not uplink power limited in a PUCCH group. For example, configured SRS signals transmissions may be dropped (not transmitted) because the wireless device does not have sufficient transmit power to transmit SRS signals in a PUCCH group in parallel with data and/or control signals in another PUCCH group.

FIG. 15 shows a table providing some example signal transmission scenarios for transmission of SRS and PUSCH/PUCCH in the uplink that may be implemented in an example LTE-Advanced network, when multiple TAGs are not configured. These example scenarios may be applicable within the same PUCCH group. SRS transmissions in a PUCCH group may not depend on transmissions in another PUCCH group. For example, when SRS is transmitted in a first PUCCH group and PUSCH/PUCCH are transmitted in a second PUCCH group, the UE may not use the rules/procedures in the table below for deciding on SRS or PUCCH transmission.

In an example embodiment, scenarios wherein a UE may not transmit (drop) a configured transmission of PUCCH signal because of overlapping with SRS signals may be limited within the same PUCCH group. For example, a UE may not transmit PUCCH format 2 without HARQ-ACK, if this PUCCH transmission happen to coincide in the same subframe in time with a type 1 triggered SRS in the same PUCCH group. The UE may transmit PUCCH format 2 without HARQ-ACK in a first PUCCH group, if this PUCCH transmission happen to coincide in the same subframe in time with a type 1 triggered SRS of a second PUCCH group.

In an example embodiment, a wireless device may receive from a base station, at least one message comprising configuration parameters of a plurality of cells being grouped into a plurality of physical uplink control channel (PUCCH) groups. PUCCH groups comprise a primary PUCCH group comprising a primary cell with a primary PUCCH transmitted to the base station and a secondary PUCCH group comprising a PUCCH secondary cell with a secondary PUCCH transmitted to the base station. The at least one message comprises sounding reference signal (SRS) configuration parameters of one or more cells. The wireless device may transmit a first format 2 PUCCH signal without HARQ-ACK on the primary cell in parallel with a first SRS on a second cell of the secondary PUCCH group. The wireless device may drop a configured transmission of a second format 2 PUCCH signal without HARQ-ACK on the primary cell when a second SRS signal is transmitted on a third cell of the primary PUCCH group in parallel with the configured transmission of the second format 2 PUCCH signal. The third cell may be the primary cell or any other cell in the primary PUCCH group. The second cell may be the PUCCH secondary cell or any other cell in the secondary PUCCH group.

In an example embodiment, a UE may transmit in parallel an SRS signal in the secondary PUCCH group in parallel with PRACH transmission in a primary cell group. This may further reduce SRS dropping.

An example embodiment may reduce the dropping possibilities of both SRS signals and PUCCH signals. Example embodiment of the invention may be applicable when the UE is not uplink power limited and has enough power to transmit SRS signals in parallel with other uplink signals.

In an example implementation, parallel transmission of PRACH on primary cell and SRS signals on secondary cells of primary PUCCH group and secondary PUCCH groups may be permitted. In an example embodiment, parallel transmission of PUCCH/PUSCH in a first cell of a first PUCCH group and SRS signals in a second cell of a second PUCCH group may be allowed. Parallel transmission of PRACH in a first cell in a first PUCCH group and SRS signals in a second cell of a second PUCCH group may be allowed. A preamble on PRACH may be transmitted because the corresponding TAG is out of sync.

In an example embodiment, when multiple TAGs are configured, multiple PRACHs may be configured. The UE may transmit SRS in a first TAG in parallel with PRACH transmission in a second TAG. The UE may drop SRS signal when it coincides with PRACH transmission in the same TAG.

An implementation of a UE sounding procedure is described in the specification. If the UE is configured with a PUCCH SCell (configured with PUCCH groups), the UE may apply the sounding procedures for both primary PUCCH group and secondary PUCCH group. The UE may apply the sounding procedures for the primary PUCCH group independent of the signals transmitted in the secondary PUCCH group. The UE may apply the sounding procedures for the secondary PUCCH group independent of the signals transmitted in the primary PUCCH group.

Example UE sounding (SRS) transmission procedures are described in the following paragraphs. When the procedures are applied for the primary PUCCH group, the terms secondary cell, secondary cells, serving cell, and serving cells may refer to secondary cell, secondary cells, serving cell or serving cells belonging to the primary PUCCH group respectively. When the procedures are applied for secondary PUCCH group, the terms secondary cell, secondary cells, serving cell and serving cells may refer to secondary cell, secondary cells (not including the PUCCH SCell), serving cell, serving cells belonging to the secondary PUCCH group respectively.

A UE may transmit sounding reference signal (SRS) on per serving cell SRS resources at least based on two trigger types: trigger type 0: higher layer signalling and trigger type 1 employing DCI signalling, e.g. DCI formats 0/4/1A for FDD and TDD and DCI formats 2B/2C/2D for TDD. In FDD and in full uplink subframes of TDD, an SRS is transmitted in the last symbol of a subframe.

In an example embodiment, in case both trigger type 0 and trigger type 1 SRS transmissions occur in the same subframe in the same serving cell, the UE may transmit the trigger type 1 SRS transmission.

A UE may be configured with SRS parameters for trigger type 0 and trigger type 1 on a serving cell. The following SRS parameters may be serving cell specific and semi-statically configurable by higher layers (e.g. RRC layer) for trigger type 0 and for trigger type 1. For example, an eNB may transmit one or more RRC messages to the UE. The one or more RRC messages may comprise one or more of the following parameters:

Number of combs $K_{TC}$ for trigger type 0 and a configuration of trigger type 1, if configured Transmission comb $\overline{k}_{TC}$, for trigger type 0 and configuration of trigger type 1

Starting physical resource block assignment $n_{RRC}$ for trigger type 0 and configuration of trigger type 1 duration: single or indefinite (until disabled), for trigger type 0 srs-ConfigIndex ISRS for SRS periodicity $T_{SRS}$ and SRS subframe offset $T_{offset}$, an Example is shown in FIG. 16A Table A, for trigger type 0 and SRS periodicity $T_{SRS,1}$ and SRS subframe offset $T_{offset,1}$ other tables may apply SRS bandwidth $B_{SRS}$, for trigger type 0 and configuration of trigger type 1

Frequency hopping bandwidth, $b_{hop}$ for trigger type 0

Cyclic shift $n_{SRS}^{cs}$, for trigger type 0 and configuration of trigger type 1

Number of antenna ports $N_p$ for trigger type 0 and configuration of trigger type 1

For trigger type 1 and DCI format 4 three sets of SRS parameters, srs-ConfigApDCI-Format4, may be configured by higher layer signalling. The 2-bit SRS request field in DCI format 4 may indicate the SRS parameter set follows for different values of SRS request field: '00': No type 1 SRS trigger, '01': The 1st SRS parameter set configured by higher layers, '10': The 2nd SRS parameter set configured by higher layers, '11': The 3rd SRS parameter set configured by higher layers.

For trigger type 1 and DCI format 0, a single set of SRS parameters, srs-ConfigApDCI-Format0, may be configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit for DCI formats 0/1A/2B/2C/2D, with a type 1 SRS triggered if the value of the SRS request field is set to '1'. A 1-bit SRS request field may be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

The serving cell specific SRS transmission bandwidths C SRS may be configured by higher layers. The serving cell specific SRS transmission sub-frames may be configured by higher layers. For a TDD serving cell, SRS transmissions may occur in UpPTS and uplink subframes of the UL/DL configuration indicated by the higher layer parameter subframeAssignment for the serving cell.

When closed-loop UE transmit antenna selection is enabled for a given serving cell for a UE that supports transmit antenna selection, the index $a(n_{SRS})$, of the UE antenna that transmits the SRS at time nSRS may be given by $a(n_{SRS})=n_{SRS} \mod 2$, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \mod 2 & \text{when } K \text{ is even} \\ n_{SRS} \mod 2 & \text{when } K \text{ is odd} \end{cases},$$

$$\beta = \begin{cases} 1 & \text{where } K \mod 4 = 0 \\ 0 & \text{otherwise} \end{cases}$$

when frequency hopping is enabled (i.e., $b_{hop} < B_{SRS}$), and $$K = \prod_{b'=b_{hop}}^{B_{SRS}} N_{b'}$$

(where $N_{b_{hop}}=1$ regardless of the $N_b$ value). An exception may be when a single SRS transmission is configured for the UE. If a UE is configured with more than one serving cell, the UE may not be expected to transmit SRS on different antenna ports simultaneously.

A UE may be configured to transmit SRS on $N_p$ antenna ports of a serving cell where $N_p$ may be configured by higher layer signalling (e.g. RRC layer). For PUSCH transmission mode 1 $N_p \in \{0,1,2,4\}$ and for PUSCH transmission mode 2 $N_p \in \{0,1,2\}$ with two antenna ports configured for PUSCH and $N_p \in \{0,1,4\}$ with 4 antenna ports configured for PUSCH. A UE configured for SRS transmission on multiple antenna ports of a serving cell may transmit SRS for the configured transmit antenna ports within one SC-FDMA symbol of the same subframe of the serving cell. The SRS transmission bandwidth and starting physical resource block assignment may be the same for configured antenna ports of a given serving cell. The UE may not support a value of $K_{TC}$ set to '4', if the UE is configured for SRS transmission on 4 antenna ports of a serving cell.

A UE not configured with multiple TAGs may not transmit SRS in a symbol whenever SRS and PUSCH transmissions happen to overlap in the same symbol. As described, the following procedures apply to the same PUCCH group. For example, an SRS in a first PUCCH group may be transmitted in parallel (overlapping in the same symbol) with PUSCH in a second PUCCH group.

For TDD serving cell, and UE not configured with additional SC-FDMA symbols in UpPTS, when one SC-FDMA symbol exists in UpPTS of the given serving cell, it may be used for SRS transmission, when two SC-FDMA symbols exist in UpPTS of the given serving cell, both may be used for SRS transmission and for trigger type 0 SRS both may be assigned to the same UE. For TDD serving cell, and if the UE is configured with two or four additional SC-FDMA symbols in UpPTS of the given serving cell, they may be used for SRS transmission and for trigger type 0 SRS at most one may be assigned to the same UE.

If a UE is not configured with multiple TAGs, or if a UE is configured with multiple TAGs and SRS and PUCCH format 2/2a/2b happen to coincide in the same subframe in the same serving cell, The UE may not transmit type 0 triggered SRS whenever type 0 triggered SRS and PUCCH format 2/2a/2b transmissions happen to coincide in the same subframe;

The UE may not transmit type 1 triggered SRS whenever type 1 triggered SRS and PUCCH format 2a/2b or format 2 with HARQ-ACK transmissions happen to coincide in the same subframe;

The UE may not transmit PUCCH format 2 without HARQ-ACK whenever type 1 triggered SRS and PUCCH format 2 without HARQ-ACK transmissions happen to coincide in the same subframe.

If a UE is not configured with multiple TAGs, or if a UE is configured with multiple TAGs and SRS and PUCCH happen to coincide in the same subframe in the same serving cell, The UE may not transmit SRS whenever SRS transmission and PUCCH transmission carrying HARQ-ACK and/or positive SR happen to coincide in the same subframe if the parameter ackNackSRS-SimultaneousTransmission is FALSE;

For FDD-TDD and when frame structure 1 is used in the corresponding primary-cell/PUCCH-secondary-cell of the PUCCH group, the UE may not transmit SRS in a symbol whenever SRS transmission and PUCCH transmission carrying HARQ-ACK and/or positive SR using shortened happen to overlap in the same symbol if the parameter ackNackSRS-SimultaneousTransmission is TRUE.

Unless otherwise prohibited, the UE may transmit SRS whenever SRS transmission and PUCCH transmission carrying HARQ-ACK and/or positive SR using shortened format happen to coincide in the same subframe if the parameter ackNackSRS-SimultaneousTransmission is TRUE.

A UE not configured with multiple TAGs may not transmit SRS whenever SRS transmission on any serving cells and PUCCH transmission carrying HARQ-ACK and/or positive SR using normal PUCCH format happen to coincide in the same subframe.

In UpPTS, whenever SRS transmission instance overlaps with the PRACH region for preamble format 4 or exceeds the range of uplink system bandwidth configured in the serving cell, the UE may not transmit SRS.

As described, the procedures described here apply to the same PUCCH group. For example, the UE may transmit type 0 triggered SRS on a first PUCCH group when type 0 triggered SRS on a first PUCCH group and PUCCH format 2/2a/2b transmissions on a second PUCCH group happen to coincide in the same subframe.

The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the corresponding cell with PUCCH resource (primary-cell or PUCCH-secondary-cell) ackNackSRS-SimultaneousTransmission UE may transmit HARQ-ACK and SR using the shortened PUCCH format, where the HARQ-ACK or the SR symbol corresponding to the SRS location is punctured. This shortened PUCCH format may be used in a cell specific SRS subframe of the corresponding cell with PUCCH resource (primary-cell or PUCCH-secondary-cell) even if the UE does not transmit SRS in that subframe. Otherwise, the UE may use the normal PUCCH format 1/1a/1b or normal PUCCH format 3 or normal PUCCH format 4 or normal PUCCH format 5 for the transmission of HARQ-ACK and SR.

An example trigger type 0 SRS configuration of a UE in a serving cell for SRS periodicity, $T_{SRS}$, and SRS subframe offset, $T_{offset}$, is defined in example Table A of FIG. 16A.

Different tables may be defined for an FDD and a TDD serving cell. The periodicity $T_{SRS}$ of the SRS transmission may be serving cell specific and may be selected, e.g., from the set {2, 5, 10, 20, 40, 80, 160, 320} ms or subframes. For the SRS periodicity $T_{SRS}$ of 2 ms in TDD serving cell, two SRS resources may be configured in a half frame containing UL subframe(s) of the given serving cell.

Type 0 triggered SRS transmission instances in a given serving cell for TDD serving cell with $T_{SRS}>2$ and for FDD serving cell may be the subframes satisfying $(10 \cdot n_f + k_{SRS} - T_{offset}) \bmod T_{SRS}=0$, where for FDD $k_{SRS}=\{0,1, \ldots, 9\}$ is the subframe index within the frame, for TDD serving cell, if the UE is configured with two or four additional SC-FDMA symbols in UpPTS, $k_{SRS}$ may be defined in example Table B of FIG. 16B; otherwise $k_{SRS}$ may be defined in example Table C of FIG. 16C. The SRS transmission instances for TDD serving cell with $T_{SRS}=2$ may be the subframes satisfying $(k_{SRS}-T_{offset}) \bmod 5=0$.

In an example implementation, for a TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m, the UE may not transmit trigger type 0 SRS in a subframe of radio frame m that is indicated by the parameter eimta-HARQ-ReferenceConfig-r12 as a downlink subframe unless the UE transmits PUSCH in the same subframe.

Trigger type 1 SRS configuration of a UE in a serving cell for SRS periodicity, $T_{SRS,1}$, and SRS subframe offset, $T_{offset,1}$ may be defined in a preconfigured configuration table, for FDD and TDD serving cell, respectively. The periodicity $T_{SRS,1}$ of the SRS transmission may be serving cell specific and may be selected from the set {2, 5, 10} ms or subframes. For the SRS periodicity $T_{SRS,1}$ of 2 ms in TDD serving cell, two SRS resources may be configured in a half frame containing UL subframe(s) of the given serving cell.

A UE configured for type 1 triggered SRS transmission in serving cell c and not configured with a carrier indicator field may transmit SRS on serving cell c upon detection of a positive SRS request in PDCCH/EPDCCH scheduling PUSCH/PDSCH on serving cell c.

A UE configured for type 1 triggered SRS transmission in serving cell c and configured with a carrier indicator field may transmit SRS on serving cell c upon detection of a positive SRS request in PDCCH/EPDCCH scheduling PUSCH/PDSCH with the value of carrier indicator field corresponding to serving cell c.

A UE configured for type 1 triggered SRS transmission on serving cell c upon detection of a positive SRS request in subframe n of serving cell c may commence SRS transmission in the first subframe satisfying n+k, k≥4 and $(10 \cdot n_f + k_{SRS}-T_{offset,1}) \bmod T_{SRS,1}=0$ for TDD serving cell c with $T_{SRS,1}>2$ and for FDD serving cell c, $(k_{SRS}-T_{offset,1}) \bmod 5=0$ for TDD serving cell c with $T_{SRS,1}=2$, where for FDD serving cell c $k_{SRS}=\{0, 1, \ldots, 9\}$ may be the subframe index within the frame $n_f$, for TDD serving cell c, if the UE is configured with two or four additional SC-FDMA symbols in UpPTS, $k_{SRS}$ may be defined in example Table C in FIG. 16C otherwise $k_{SRS}$ may be defined in example Table B in FIG. 16B.

A UE configured for type 1 triggered SRS transmission may not be expected to receive type 1 SRS triggering events associated with different values of trigger type 1 SRS transmission parameters, as configured by higher layer signalling, for the same subframe and the same serving cell. For TDD serving cell c, and a UE configured with EIMTA-MainConfigServCell-r12 for a serving cell c, the UE may not transmit SRS in a subframe of a radio frame that is indicated by the corresponding eIMTA-UL/DL-configuration as a downlink subframe.

A UE may not transmit SRS whenever SRS and a PUSCH transmission corresponding to a Random Access Response Grant or a retransmission of the same transport block as part of the contention based random access procedure coincide in the same subframe.

An example embodiment for SRS implementation is described. A sounding reference signal sequence $r_{SRS}^{(\tilde{p})}(n) = r_{u,v}^{(\alpha_{\tilde{p}})}(n)$ may be defined, where u is the sequence-group number and v is the base sequence number. The cyclic shift $\alpha_{\tilde{p}}$ of the sounding reference signal may be given as $$\alpha_{\tilde{p}} = 2\pi \frac{n_{SRS}^{cs,\tilde{p}}}{n_{SRS}^{cs,max}}$$

$$n_{SRS}^{cs,\tilde{p}} = \left(n_{SRS}^{cs} + \frac{n_{SRS}^{cs,max} \tilde{p}}{N_{ap}}\right) \bmod n_{SRS}^{cs,max}$$

$$\tilde{p} \in \{0, 1, \ldots, N_{ap} - 1\},$$

where $n_{SRS}^{cs}=\{0,1, \ldots, n_{SRS}^{cs,max}\}$ may configured separately for periodic and configuration of aperiodic sounding by the higher-layer parameters cyclicShift and cyclicShift-ap, respectively, for a UE and $N_{ap}$ is the number of antenna ports used for sounding reference signal transmission. In an example embodiment, the parameter $n_{SRS}^{cs,max}=8$ if $K_{TC}=2$ for sounding reference signal configurations, otherwise $n_{SRS}^{cs,max}=12$.

The sequence may be multiplied with the amplitude scaling factor $\beta_{SRS}$ in order to conform to the transmit power $P_{SRS}$ and mapped in sequence starting with $r_{SRS}^{(\tilde{p})}(0)$ to resource elements (k,l) on antenna port p according to $$a_{K_{TC}k'+k_0^{(p)},l}^{(p)} = \begin{cases} \frac{1}{\sqrt{N_{ap}}} \beta_{SRS} r_{SRS}^{(\tilde{p})}(k') & k' = 0, 1, \ldots, M_{sc,b}^{RS} - 1 \\ 0 & \text{otherwise} \end{cases}$$

In an example, $N_{ap}$ is the number of antenna ports used for sounding reference signal transmission and the relation between the index $\tilde{p}$ and the antenna port p may be predefined. The parameter $K_{TC}$ may be given by the higher-layer parameter [Number-of-combs] if configured, otherwise $K_{TC}=2$. The set of antenna ports used for sounding reference signal transmission may be configured independently for periodic and configuration of aperiodic sounding.

The quantity $k_0^{(p)}$ may be the frequency-domain starting position of the sounding reference signal and for $b=B_{SRS}$ and $M_{sc,b}^{RS}$ may be the length of the sounding reference signal sequence defined as $M_{sc,b}^{RS}=m_{SRS,b}N_{sc}^{RB}/K_{TC}$, where $m_{SRS,b}$ may be predfined for uplink bandwidth $N_{RB}^{UL}$. The cell-specific parameter srs-BandwidthConfig, $C_{SRS} \in \{0,1,2,3,4,5,6,7\}$ and the UE-specific parameter srs-Bandwidth, $B_{SRS} \in \{0,1,2,3\}$ may be given by higher layers. For UpPTS, $m_{SRS,0}$ may be reconfigured to $m_{SRS,0}^{max} = \max_{c \in C_{SRS}} \{m_{SRS,0}^c\} \geq (N_{RB}^{UL} - 6N_R)$ if this reconfiguration is enabled by the cell-specific parameter srsMaxUpPts given by higher layers, otherwise if the reconfiguration is disabled $m_{SRS,0}^{max} = m_{SRS,0}$, where c is a SRS BW configuration and $C_{SRS}$ is the set of SRS BW configurations predefined for uplink bandwidth $N_{RB}^{UL}$, $N_{RA}$ may be the number of format 4 PRACH in the addressed UpPTS and may be predefined according to a configuration table.

The frequency-domain starting position $k_0^{(p)}$ is defined by $$k_0^{(p)} = \bar{k}_0^{(p)} + \prod_{b=0}^{B_{SRS}} K_{TC} M_{sc,b}^{RS} n_b$$

where for normal uplink subframes $\bar{k}_0^{(p)}$ is defined by $\bar{k}_0^{(p)} = (\lfloor N_{RB}^{UL}/2 \rfloor - m_{SRS,0}/2)N_{SC}^{RB} + k_{TC}^{(p)}$ and for UpPTS by $$\bar{k}_0^{(p)} = \begin{cases} (N_{RB}^{UL} - m_{SRS,0}^{max})N_{sc}^{RB} + k_{TC}^{(p)} & \text{if } ((n_f \bmod 2) \cdot (2-N_{SP}) + n_{hf}) \bmod 2 = 0 \\ k_{TC}^{(p)} & \text{otherwise} \end{cases}$$

The quantity $k_{TC}^{(p)} \in \{0,1,\ldots,K_{TC}-1\}$ is given by $$k_{TC}^{(p)} = \begin{cases} 1-\bar{k}_{TC} & \text{if } n_{SRS}^{cs} \in \{4,5,6,7\} \text{ and } \tilde{p} \in \{1,3\} \text{ and } N_{ap}=4 \\ \bar{k}_{TC} & \text{otherwise} \end{cases}$$

In an example, the relation between the index $\tilde{p}$ and the antenna port p may be predefined, $k_{TC}^{(p)} \in \{0,1,\ldots,K_{TC}-1\}$ is given by the UE-specific parameter transmissionComb or transmissionComb-ap for periodic and configuration of aperiodic transmission, respectively, provided by higher layers for the UE, and $n_b$ is frequency position index. The variable $n_{hf}$ is equal to 0 for UpPTS in the first half frame and equal to 1 for UpPTS in the second half frame of a radio frame.

The frequency hopping of the sounding reference signal may be configured by parameter $b_{hop} \in \{0,1,2,3\}$, provided by higher-layer parameter srs-HoppingBandwidth. Frequency hopping may not be supported for aperiodic transmission. If frequency hopping of the sounding reference signal is not enabled (e.g., $b_{hop} \geq B_{SRS}$), the frequency position index $n_b$ remains constant (unless re-configured) and is defined by $n_b = \lfloor 4n_{RRC}/m_{SRS,b} \rfloor \bmod N_b$ where the parameter $n_{RRC}$ is given by higher-layer parameters freqDomainPosition and freqDomainPosition-ap for periodic and configuration of aperiodic transmission, respectively. If frequency hopping of the sounding reference signal is enabled (i.e., $b_{hop} < B_{SRS}$), the frequency position indexes $n_b$ may be defined based on a predefined formulas.

The sounding reference signal may be transmitted in the last symbol of the uplink subframe.

An eNB may transmit one or more RRC messages to a UE to configure SRS signals on one or more cells. The one or more RRC messages may comprise the IE SoundingRS-UL-Config to specify the uplink Sounding RS configuration for periodic and aperiodic sounding of a cell. For example, the IE SoundingRS-UL-ConfigCommon may comprise srs-BandwidthConfig:ENUMERATED {bw0, bw1, bw2, bw3, bw4, bw5, bw6, bw7}, srs-SubframeConfig: ENUMERATED {sc0, sc 1, sc2, sc3, sc4, sc5, sc6, sc7, sc8, sc9, sc10, sc11, sc12, sc13, sc14, sc15}, ackNackSRS-Simultaneous-Transmission: BOOLEAN, and/or srs-MaxUpPts: ENUMERATED {true} OPTIONAL—Cond TDD.

The IE SoundingRS-UL-ConfigDedicated may comprise srs-Bandwidth:ENUMERATED {bw0, bw1, bw2, bw3}, srs-HoppingBandwidth:ENUMERATED {hbw0, hbw1, hbw2, hbw3},freqDomainPosition:INTEGER (0 . . . 23), duration:BOOLEAN,srs-ConfigIndex:INTEGER (0 . . . 1023),transmissionComb:INTEGER (0 . . . 1), and/or cyclicShift: ENUMERATED {cs0, cs1, cs2, cs3, cs4, cs5, cs6, cs7}}. The IE SoundingRS-UL-ConfigDedicated may comprise srs-AntennaPort:SRS-AntennaPort. The IE SoundingRS-UL-ConfigDedicated may comprise transmissionComb: INTEGER (2 . . . 3); cyclicShift:ENUMERATED {cs8, cs9, cs10, cs11}; and/or transmissionCombNum: ENUMERATED {n2, n4}.

Figure 17:
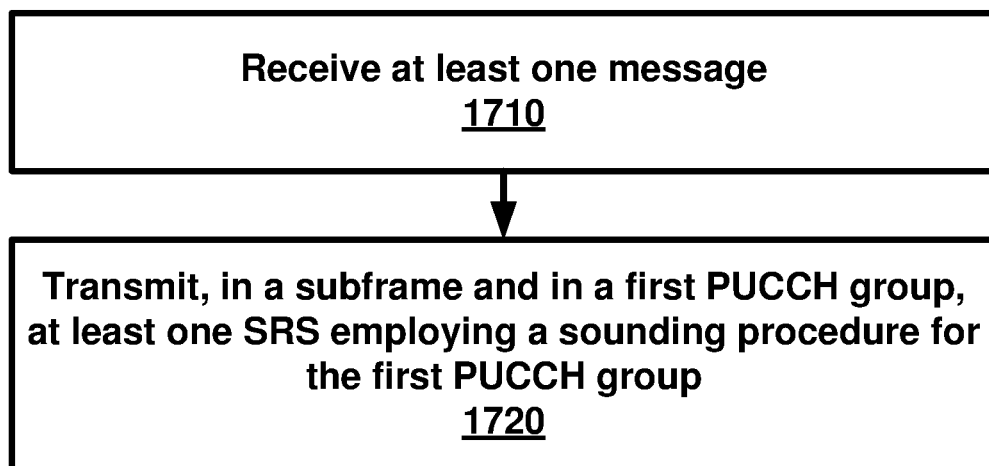
FIG. 17 is an example flow diagram as per an aspect of an embodiment of the present invention.

FIG. 17 is an example flow diagram as per an aspect of an embodiment of the present invention. A wireless device may receive at least one message from a base station at 1710. The message(s) may comprise one or more configuration parameters of a plurality of cells. The plurality of cells may be grouped into a plurality of o physical uplink control channel (PUCCH) groups. The PUCCH groups may comprise a first PUCCH group and a second PUCCH group. The first PUCCH group may comprise a first PUCCH cell with a first PUCCH transmitted to the base station. The second PUCCH group may comprise a second PUCCH cell with a second PUCCH transmitted to the base station. According to an embodiment, the wireless device may not be uplink power limited. In an example, the first PUCCH group is a primary PUCCH group and the second PUCCH group is a secondary PUCCH group. In another example, the first PUCCH group is a secondary PUCCH group and the second PUCCH group is a primary PUCCH group.

At 1720, the wireless device may transmit, in a subframe and in the first PUCCH group, at least one SRS employing a sounding procedure for the first PUCCH group. The sounding procedure may depend, at least in part, on transmissions of a physical uplink shared channel (PUSCH) and/or a PUCCH in the first PUCCH group. The sounding procedure may be independent of transmissions of PUCCH and PUSCH in the second PUCCH group.

According to an embodiment, the sounding procedure may comprise a first procedure for transmitting one or more SRSs and a second procedure for dropping transmission of one or more SRSs. According to an embodiment, the wireless device may further comprise transmitting a first SRS on a first cell of the first PUCCH group in parallel with a first data packet on a second cell of the second PUCCH group. The wireless device may further comprise dropping a configured transmission of a second SRS on the first cell when a second data packet is transmitted on a third cell of the first PUCCH group in parallel with the configured transmission of the second SRS. According to an embodiment, the wireless device may further comprise transmitting a first SRS on a first cell of the first PUCCH group in parallel with a first PUCCH signal on the second PUCCH cell. The wireless device may further comprise dropping a configured transmission of a second SRS on the first cell when a second PUCCH signal is transmitted on the first PUCCH cell in parallel with the configured transmission of the second SRS.

According to an embodiment, message(s) may comprise SRS configuration parameters comprising an SRS bandwidth parameter and an SRS subframe configuration parameter. According to an embodiment, the wireless device may further comprise triggering an SRS type 1 transmission in response to a message in the at least one message. The wireless device may further comprise triggering an SRS type 2 transmission in response to downlink control information transmitted on a downlink physical channel.

Figure 18:
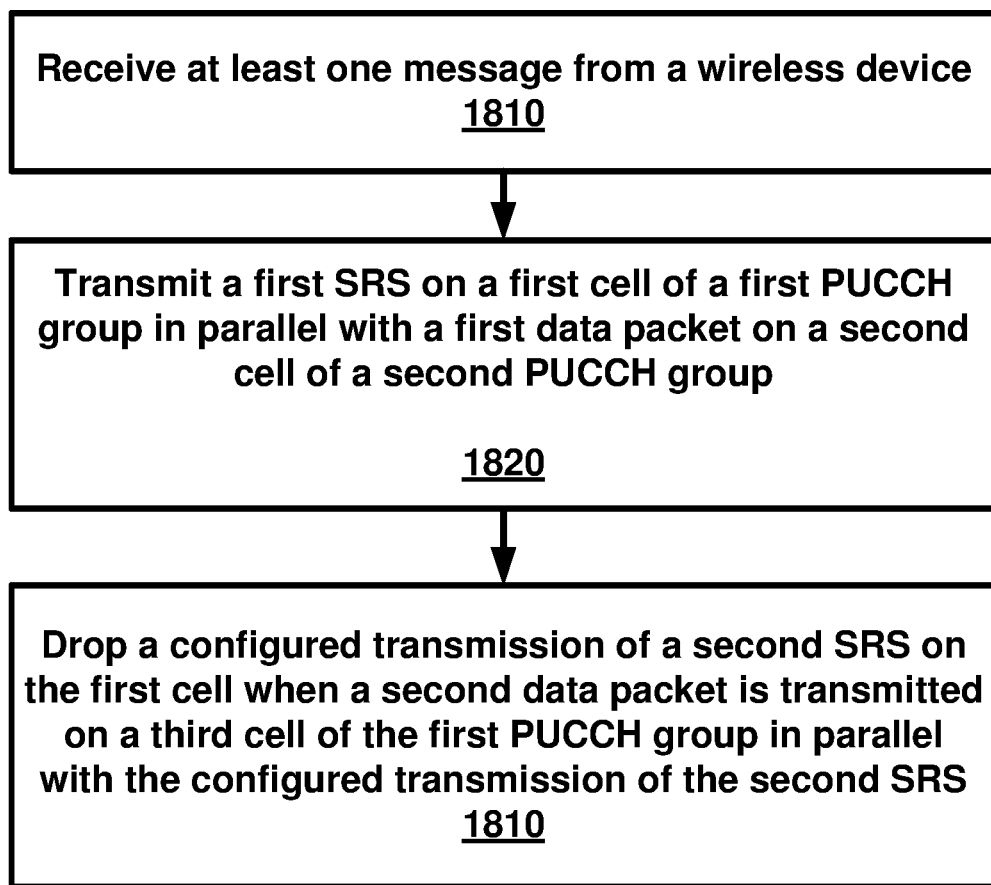
FIG. 18 is an example flow diagram as per an aspect of an embodiment of the present invention.

FIG. 18 is an example flow diagram as per an aspect of an embodiment of the present invention. A wireless device may receive at least one message from a base station at 1810. The message(s) may comprise one or more configuration parameters of a plurality of cells. The plurality of cells may be grouped into a plurality of o physical uplink control channel (PUCCH) groups. The PUCCH groups may comprise a first PUCCH group and a second PUCCH group. The first PUCCH group may comprise a first PUCCH cell with a first PUCCH transmitted to the base station. The second PUCCH group may comprise a second PUCCH cell with a second PUCCH transmitted to the base station. According to an embodiment, the wireless device may not be uplink power limited.

At 1820, the wireless device may transmit a first SRS on a first cell of the first PUCCH group in parallel with a first data packet on a second cell of the second PUCCH group. At 1830, the wireless device may drop a configured transmission of a second SRS on the first cell when a second data packet is transmitted on a third cell of the first PUCCH group in parallel with the configured transmission of the second SRS.

According to an embodiment, the first cell may be the same as the first PUCCH cell. The second cell may be the same as the second PUCCH cell. According to an embodiment, the wireless device may further transmit a first PUCCH signal on the second PUCCH cell in parallel with the first SRS.

According to an embodiment, message(s) may comprise SRS configuration parameters. The SRS configuration parameters may comprise, for example, an SRS bandwidth parameter, and/or an SRS subframe configuration parameter. According to an embodiment, the wireless device may further trigger an SRS type 1 transmission in response to a message in the at least one message. The wireless device may trigger an SRS type 2 transmission in response to downlink control information transmitted on a downlink physical channel.

Figure 19:
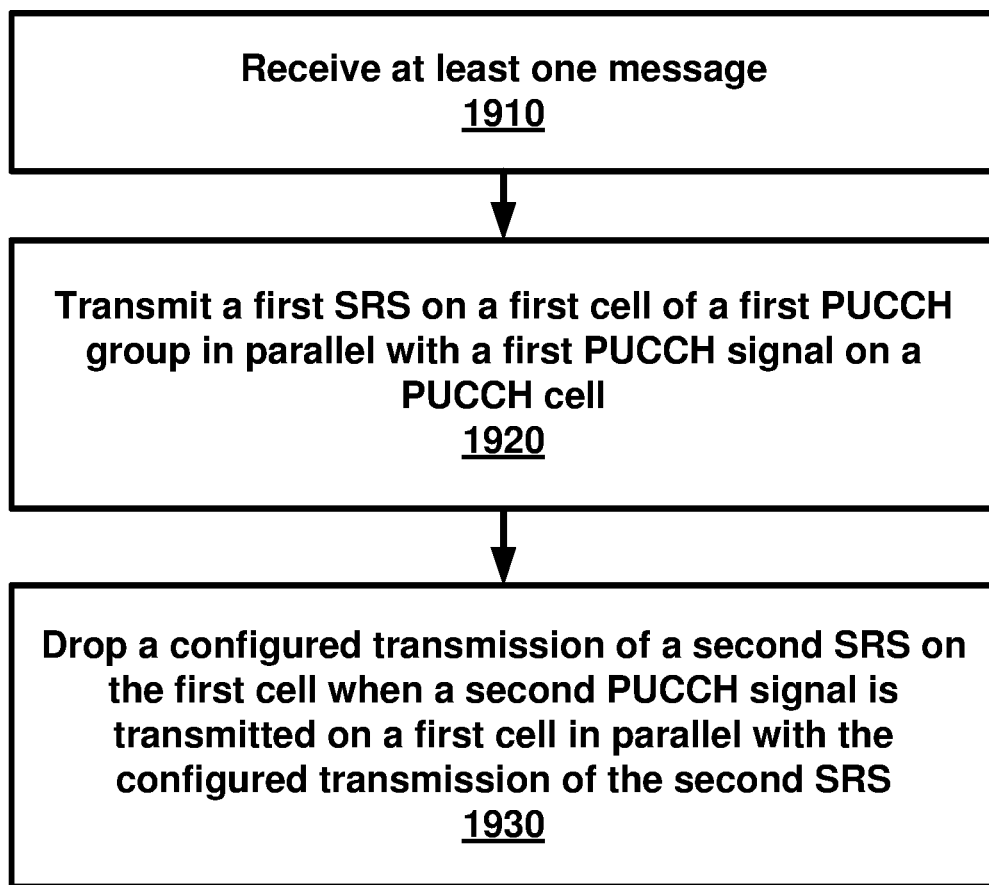
FIG. 19 is an example flow diagram as per an aspect of an embodiment of the present invention.

FIG. 19 is an example flow diagram as per an aspect of an embodiment of the present invention. A wireless device may receive at least one message from a base station at 1910. The message(s) may comprise one or more configuration parameters of a plurality of cells. The plurality of cells may be grouped into a plurality of o physical uplink control channel (PUCCH) groups. The PUCCH groups may comprise a first PUCCH group and a second PUCCH group. The first PUCCH group may comprise a first PUCCH cell with a first PUCCH transmitted to the base station. The second PUCCH group may comprise a second PUCCH cell with a second PUCCH transmitted to the base station. According to an embodiment, the wireless device may not be uplink power limited.

At 1920, the wireless device may transmit a first SRS on a first cell of the first PUCCH group in parallel with a first PUCCH signal on the second PUCCH cell. At 1930, the wireless device may drop a configured transmission of a second SRS on the first cell when a second PUCCH signal is transmitted on the first PUCCH cell in parallel with the configured transmission of the second SRS.

According to an embodiment, the first cell may be the same as the first PUCCH cell. According to an embodiment, the wireless device may transmit a first data packet on the second PUCCH group in parallel with the first SRS. According to an embodiment, the first PUCCH signal and the second PUCCH signal may be of a PUCCH format 2/2a/2b and the first SRS and the second SRS may be of Type 0. According to an embodiment, the first PUCCH signal and the second PUCCH signal may be of a PUCCH format 2a/2b with HARQ-ACK transmission and the first SRS and the second SRS are of Type 1. According to an embodiment, the at least one message may comprise SRS configuration parameters comprising: an SRS bandwidth parameter; and an SRS subframe configuration parameter. According to an embodiment, the wireless device may trigger an SRS type 1 transmission in response to a message in the at least one message. The wireless device may trigger an SRS type 2 transmission in response to downlink control information transmitted on a downlink physical channel.

According to an embodiment, a wireless device may receive at least one message comprising configuration parameters of a plurality of cells grouped into a plurality of physical uplink control channel (PUCCH) groups. The wireless device may transmit, in a subframe and in a first PUCCH group, at least one SRS employing a sounding procedure for the first PUCCH group. The sounding procedure may depend, at least in part, on transmissions of a physical uplink shared channel (PUSCH) or a PUCCH in the first PUCCH group, and the sounding procedure may be independent of transmissions of PUCCH and PUSCH in a second PUCCH group.

According to an embodiment, a wireless device may receive at least one message comprising configuration parameters of a plurality of cells grouped into a plurality of physical uplink control channel (PUCCH) groups. The wireless device may transmit a first SRS on a first cell of a first PUCCH group in parallel with a first data packet on a second cell of a second PUCCH group. The wireless device may drop a configured transmission of a second SRS on the first cell when a second data packet is transmitted on a third cell of the first PUCCH group in parallel with the configured transmission of the second SRS.

According to an embodiment, a wireless device may receive at least one message comprising configuration parameters of a plurality of cells grouped into a plurality of physical uplink control channel (PUCCH) groups. The wireless device may transmit a first SRS on a first cell of a first PUCCH group in parallel with a first PUCCH signal on a second PUCCH cell. The wireless device may drop a configured transmission of a second SRS on the first cell when a second PUCCH signal is transmitted on a first PUCCH cell in parallel with the configured transmission of the second SRS.

A primary PUCCH group may comprise a group of serving cells including a PCell whose PUCCH signalling may be associated with the PUCCH on PCell. A PUCCH group may comprise either a primary PUCCH group and/or a secondary PUCCH group. A PUCCH SCell may comprise Secondary Cell configured with a PUCCH. A Secondary PUCCH group may comprise a group of SCells whose PUCCH signalling is associated with the PUCCH on the PUCCH SCell. A PUCCH may be transmitted on a PCell, a PUCCH SCell (if such is configured in CA) and/or on a PSCell (e.g. in Dual Conductivity (DC)).

A configured set of serving cells for a UE may comprise one PCell and one or more SCells. If DC is not configured, one additional PUCCH may be configured on an SCell, the PUCCH SCell. When a PUCCH SCell is configured, an RRC may configure the mapping of each serving cell to a Primary PUCCH group and/or a Secondary PUCCH group (e.g., for each SCell whether the PCell and/or the PUCCH SCell is employed for the transmission of ACK/NAKs and CSI reports.

A UE may be configured with SRS parameters for trigger type 0 and trigger type 1 on each serving cell. The following SRS parameters may be serving cell specific and semi-statically configurable by higher layers for trigger type 0 and/or for trigger type 1.

According to an example embodiment, if a UE is configured with a PUCCH-SCell, the UE may apply procedures for both primary PUCCH group and secondary PUCCH group. For example, when procedures are applied for a primary PUCCH group, the terms 'secondary cell', 'secondary cells', 'serving cell', and/or 'serving cells' may refer to secondary cell, secondary cells, serving cell and/or serving cells belonging to the primary PUCCH group respectively. For example, when procedures are applied for a secondary PUCCH group, the terms 'secondary cell', 'secondary cells', 'serving cell' and/or 'serving cells' may refer to secondary cell, secondary cells (not including the PUCCH-SCell), serving cell, serving cells belonging to the secondary PUCCH group respectively. The term 'primary cell' may refer to the PUCCH-SCell of the secondary PUCCH group.

A UE may transmit Sounding Reference Symbol (SRS) on per serving cell SRS resources based on two trigger types: trigger type 0 (e.g. higher layer signaling), trigger type 1 (e.g. DCI formats 0/4/1A for FDD and TDD and DCI formats 2B/2C/2D for TDD).

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
receiving, by a wireless device, configuration parameters of cells grouped into physical uplink control channel (PUCCH) groups, wherein the cells are in the same timing advance group;
transmitting a first sounding reference signal (SRS) via a first cell of a first PUCCH group in parallel with transmission of a first PUCCH via a second cell of a second PUCCH group; and
dropping, in response to a second PUCCH being transmitted via the first cell in parallel with a configured transmission of a second SRS, the configured transmission of the second SRS via the first cell.

2. The method of claim 1, wherein the wireless device is not uplink power limited during:
the transmitting the first SRS; and
a timing of the configured transmission of the second SRS.

3. The method of claim 1, wherein:
the first PUCCH group is a primary PUCCH group and the first cell is a primary cell; and
the second PUCCH group is a secondary PUCCH group and the second cell is a PUCCH secondary cell.

4. The method of claim 1, further comprising transmitting, in a time interval and via the first PUCCH group, at least one SRS employing a sounding procedure for the first PUCCH group, wherein the sounding procedure:
depends on transmissions, in the time interval, of a PUCCH in the first PUCCH group; and
is independent of transmissions, in the time interval, of a PUCCH in the second PUCCH group.

5. The method of claim 4, wherein the sounding procedure comprises a first procedure for transmitting one or more SRSs and a second procedure for dropping transmission of one or more SRSs.

6. The method of claim 1, further comprising transmitting a third SRS via the second cell of the second PUCCH group in parallel with transmission of a third PUCCH via the first cell of the PUCCH first group.

7. The method of claim 1, wherein the configuration parameters comprises SRS configuration parameters comprising:
an SRS bandwidth parameter; and
an SRS subframe configuration parameter.

8. The method of any of claim 1, further comprising:
triggering an SRS type 1 transmission in response to the configuration parameters; and
triggering an SRS type 2 transmission in response to downlink control information transmitted on a downlink physical channel.

9. The method of claim 1, further comprising:
transmitting a third SRS via the first cell of the first PUCCH group in parallel with a first data packet via the second cell of the second PUCCH group; and
dropping a configured transmission of a fourth SRS on the first cell when a second data packet is transmitted via a third cell of the first PUCCH group in parallel with the configured transmission of the second SRS.

10. A wireless device comprising:
one or more processors; and
memory storing instructions that, when executed by the one or more processors, cause the wireless device to:
receive configuration parameters of cells grouped into physical uplink control channel (PUCCH) groups, wherein the cells are in the same timing advance group;
transmit a first sounding reference signal (SRS) via a first cell of a first PUCCH group in parallel with transmission of a first PUCCH via a second cell of a second PUCCH group; and
drop, in response to a second PUCCH being transmitted via the first cell in parallel with a configured transmission of a second SRS, the configured transmission of the second SRS via the first cell.

11. The wireless device of claim 10, wherein the wireless device is not uplink power limited during:
the transmission of the first SRS; and
a timing of the configured transmission of the second SRS.

12. The wireless device of claim 10, wherein:
the first PUCCH group is a primary PUCCH group and the first cell is a primary cell; and
the second PUCCH group is a secondary PUCCH group and the second cell is a PUCCH secondary cell.

13. The wireless device of claim 10, wherein the instructions, when executed by the one or more processors, further cause the wireless device to transmit, in a time interval and via the first PUCCH group, at least one SRS employing a sounding procedure for the first PUCCH group, wherein the sounding procedure:
depends on transmissions, in the time interval, of a PUCCH in the first PUCCH group; and
is independent of transmissions, in the time interval, of a PUCCH in the second PUCCH group.

14. The wireless device of claim 13, wherein the sounding procedure comprises a first procedure for transmitting one or more SRSs and a second procedure for dropping transmission of one or more SRSs.

15. The wireless device of claim 10, wherein the instructions, when executed by the one or more processors, further cause the wireless device to transmit a third SRS via the second cell of the second PUCCH group in parallel with transmission of a third PUCCH via the first cell of the PUCCH first group.

16. The wireless device of claim 10, wherein the configuration parameters comprises SRS configuration parameters comprising:
an SRS bandwidth parameter; and
an SRS subframe configuration parameter.

17. The wireless device of any of claim 10, wherein the instructions, when executed by the one or more processors, further cause the wireless device to:
trigger an SRS type 1 transmission in response to the configuration parameters; and
trigger an SRS type 2 transmission in response to downlink control information transmitted on a downlink physical channel.

18. The wireless device of claim 10, wherein the instructions, when executed by the one or more processors, further cause the wireless device to:
transmit a third SRS via the first cell of the first PUCCH group in parallel with a first data packet via the second cell of the second PUCCH group; and
drop a configured transmission of a fourth SRS on the first cell when a second data packet is transmitted via a third cell of the first PUCCH group in parallel with the configured transmission of the second SRS.

19. A system comprising:
a base station comprising:
  one or more first processors; and
  first memory storing first instructions that, when executed by the one or more first processors, cause the base station to:
    transmit configuration parameters of cells grouped into physical uplink control channel (PUCCH) groups, wherein the cells are in the same timing advance group; and
a wireless device comprising:
  one or more second processors; and
  second memory storing second instructions that, when executed by the one or more second processors, cause the wireless device to:
    receive the configuration parameters;
    transmit a first sounding reference signal (SRS) via a first cell of a first PUCCH group in parallel with transmission of a first PUCCH via a second cell of a second PUCCH group; and
    drop, in response to a second PUCCH being transmitted via the first cell in parallel with a configured transmission of a second SRS, the configured transmission of the second SRS via the first cell.

20. The system of claim 19, wherein the wireless device is not uplink power limited during:
the transmission of the first SRS; and
a timing of the configured transmission of the second SRS.

* * * * *